(12) United States Patent
Baba et al.

(10) Patent No.: US 10,677,220 B2
(45) Date of Patent: Jun. 9, 2020

(54) WIND TURBINE POWER GENERATING APPARATUS AND METHOD OF OPERATING THE SAME

(71) Applicant: MITSUBISHI HEAVY INDUSTRIES, LTD., Tokyo (JP)

(72) Inventors: Mitsuya Baba, Tokyo (JP); Yoshiyuki Hayashi, Tokyo (JP); Wakako Ariki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 385 days.

(21) Appl. No.: 15/393,869

(22) Filed: Dec. 29, 2016

(65) Prior Publication Data
US 2017/0218923 A1 Aug. 3, 2017

(30) Foreign Application Priority Data

Jan. 29, 2016 (JP) ................................. 2016-015024

(51) Int. Cl.
*F03D 7/02* (2006.01)
*F03D 17/00* (2016.01)

(52) U.S. Cl.
CPC ......... *F03D 7/0288* (2013.01); *F03D 7/0224* (2013.01); *F03D 7/0276* (2013.01);
(Continued)

(58) Field of Classification Search
CPC ........ F03D 7/02; F03D 7/0224; F03D 7/0276; F03D 7/028; F03D 7/0288; F03D 17/00;
(Continued)

(56) References Cited

U.S. PATENT DOCUMENTS

| 7,071,578 B1 | 7/2006 | Shibata et al. |
| 7,898,100 B2 | 3/2011 | Andersen et al. |

(Continued)

FOREIGN PATENT DOCUMENTS

| EP | 1327773 A2 | 7/2003 |
| EP | 2022981 A1 | 2/2009 |

(Continued)

OTHER PUBLICATIONS

The 1st Office Action effective Feb. 27, 2018, issued to the corresponding EP application No. 16204309.5.
(Continued)

*Primary Examiner* — Moshe Wilensky
*Assistant Examiner* — Elton K Wong
(74) *Attorney, Agent, or Firm* — Manabu Kanesaka; Benjamin Hauptman; Kenneth Berner

(57) ABSTRACT

A method of operating a wind turbine power generating apparatus includes a step of obtaining a wind direction of a wind; a step of obtaining at least one of a wind velocity of the wind or an index of turbulence degree of the wind velocity; and a step of selecting an operation mode of the wind turbine power generating apparatus from among a plurality of operation modes including a normal operation mode and at least one load-suppressing operation mode in which a load applied to a wind turbine blade is smaller than in the normal operation mode, on the basis of whether the at least one of the wind velocity or the index of turbulence degree is at least a threshold. The threshold of the at least one of the wind velocity or the index of turbulence degree is variable in accordance with the wind direction.

10 Claims, 14 Drawing Sheets

(52) U.S. Cl.
CPC .......... *F03D 17/00* (2016.05); *F05B 2200/20* (2013.01); *F05B 2270/32* (2013.01); *F05B 2270/321* (2013.01); *F05B 2270/322* (2013.01); *F05B 2270/331* (2013.01); *Y02E 10/721* (2013.01); *Y02E 10/723* (2013.01)

(58) Field of Classification Search
CPC .............. F05B 2200/20; F05B 2270/31; F05B 2270/321; F05B 2270/322; Y02E 10/721; Y02E 10/723
See application file for complete search history.

(56) References Cited

U.S. PATENT DOCUMENTS

| | | | |
|---|---|---|---|
| 7,948,104 | B2 | 5/2011 | Andersen |
| 7,950,901 | B2 | 5/2011 | Barbu et al. |
| 7,952,215 | B2 | 5/2011 | Hayashi et al. |
| 8,098,939 | B2 | 1/2012 | Oliver |
| 8,128,362 | B2 | 3/2012 | Andersen et al. |
| 8,198,741 | B2 | 6/2012 | Fukuda et al. |
| 8,301,310 | B2 | 10/2012 | Nim |
| 8,441,138 | B2 | 5/2013 | Gjerlov et al. |
| 8,793,027 | B2 | 7/2014 | Nyborg et al. |
| 8,803,351 | B2 | 8/2014 | Dalsgaard et al. |
| 8,810,055 | B2 | 8/2014 | Mascarell et al. |
| 9,190,944 | B2 | 11/2015 | Perley et al. |
| 9,222,464 | B2 | 12/2015 | Tanabe et al. |
| 2009/0047129 | A1 | 2/2009 | Yoshida |
| 2009/0206605 | A1* | 8/2009 | Schmidt ................ F03D 7/0224 290/44 |
| 2010/0283245 | A1* | 11/2010 | Gjerlov ................ F03D 7/0224 290/44 |
| 2011/0137474 | A1* | 6/2011 | Larsen ................ F03D 7/0284 700/287 |
| 2011/0187108 | A1 | 8/2011 | Wakasa |
| 2012/0051952 | A1 | 3/2012 | Knoop et al. |
| 2012/0139240 | A1 | 6/2012 | Claramunt et al. |
| 2013/0033040 | A1 | 2/2013 | Bowyer et al. |
| 2014/0035285 | A1 | 2/2014 | Creaby et al. |
| 2014/0140843 | A1 | 5/2014 | Spruce et al. |
| 2015/0115608 | A1* | 4/2015 | Draper ................ F03D 7/028 290/44 |
| 2015/0132128 | A1 | 5/2015 | Zaib et al. |
| 2016/0032890 | A1 | 2/2016 | Hammerum |
| 2016/0305402 | A1 | 10/2016 | Caponetti et al. |
| 2017/0074245 | A1 | 3/2017 | Miranda et al. |
| 2017/0321654 | A1* | 11/2017 | Zheng ................ F03D 7/043 |

FOREIGN PATENT DOCUMENTS

| | | |
|---|---|---|
| EP | 2025929 A2 | 2/2009 |
| EP | 2108829 A1 | 10/2009 |
| EP | 2249029 A2 | 11/2010 |
| EP | 2375063 A1 | 10/2011 |
| EP | 2679811 A1 | 1/2014 |
| EP | 2696068 A2 | 2/2014 |
| GB | 2480701 A | 11/2011 |
| JP | 3962645 B2 | 8/2007 |
| JP | 5022102 B2 | 9/2012 |
| WO | 2008/131778 A2 | 11/2008 |
| WO | 2011/150927 A1 | 12/2011 |
| WO | 2011/157271 A2 | 12/2011 |
| WO | 2011/157272 A2 | 12/2011 |
| WO | 2012/152280 A1 | 11/2012 |
| WO | 2013/010332 A1 | 1/2013 |
| WO | 2013/182200 A1 | 12/2013 |
| WO | 2014/173417 A1 | 10/2014 |
| WO | 2015/074664 A1 | 5/2015 |
| WO | 2015/135549 A1 | 9/2015 |

OTHER PUBLICATIONS

"Wind turbines Design requirements," IEC 61400-1, 2005, p. 21-26, International Electrotechnical Commission.
Japan Patent Office, "Office Action for Japanese Patent Application No. 2016-015024," dated Dec. 19, 2017.
Europe Patent Office, "Search Report for European Patent Application No. 16204309.5," dated Jun. 8, 2017.

* cited by examiner

WIND TURBINE POWER GENERATING APPARATUS AND METHOD OF OPERATING THE SAME

RELATED APPLICATIONS

The present application is based on, and claims priority from, Japanese Application No. JP2016-015024 filed Jan. 29, 2016, the disclosure of which is hereby incorporated by reference herein in its entirety.

TECHNICAL FIELD

The present disclosure relates to a wind turbine power generating apparatus and a method of operating the same.

BACKGROUND ART

Techniques have been proposed to change an operation mode of a wind turbine power generating apparatus to protect the wind turbine power generating apparatus under harsh weather conditions such as a high wind velocity.

For instance, Patent Document 1 discloses a method of continuously operating a wind turbine power generating apparatus in a high wind-velocity range on or above a critical wind velocity. Patent Document 1 discloses controlling the pitch angle of wind turbine blades to reduce an output non-continuously in accordance with the wind velocity in a high wind-velocity range on or above a critical wind velocity.

CITATION LIST

Patent Literature

Patent Document 1: U.S. Pat. No. 7,948,104B

SUMMARY

Wind that blows into a wind turbine rotor may be affected by the surrounding environment including terrain and arrangement of other wind turbine power generating apparatuses around the wind turbine power generating apparatus, and the wind-velocity distribution may become uneven within a rotor plane. For instance, depending on the surrounding environment of the wind turbine power generating apparatus, an air flow of wind blowing into the wind turbine rotor may generate turbulence, including: wind shear (in the vertical or horizontal direction) within a rotor plane; a diagonal flow due to upward blow, wind-direction difference, or wind-direction torsion within a rotor plane; an increase in turbulence intensity; and generation of swirls. Thus, uneven wind-velocity distribution within a rotor plane due to the surrounding environment such as terrain affects a load applied to a wind turbine blade, thereby affecting a load applied to components of a wind turbine (e.g., a drive train connected to a wind turbine rotor including a wind turbine blade, and a nacelle and a tower supporting the wind turbine rotor).

In this regard, Patent Document 1 does not disclose taking account of the surrounding environment, such as terrain, of a wind turbine power generating apparatus, when suppressing a load on a wind turbine blade.

In view of the above issues, an object of at least one embodiment of the present invention is to provide a method of operating a wind turbine power generating apparatus whereby it is possible to more appropriately reduce loads applied to components of a wind turbine.

(1) A method of operating a wind turbine power generating apparatus including a wind turbine rotor having a wind turbine blade, according to at least one embodiment of the present invention, comprises: a step of obtaining a wind direction of a wind received by the wind turbine rotor; a step of obtaining at least one of a wind velocity of the wind received by the wind turbine rotor or an index of turbulence degree of the wind velocity; and a step of selecting an operation mode of the wind turbine power generating apparatus from among a plurality of operation modes including a normal operation mode and at least one load-suppressing operation mode in which a load applied to the wind turbine blade is smaller than in the normal operation mode, on the basis of whether the at least one of the wind velocity or the index of turbulence degree is at least a threshold. The threshold of the at least one of the wind velocity or the index of turbulence degree is variable in accordance with the wind direction.

A wind velocity and a turbulence degree of wind velocity are each an index of a load on a wind turbine blade or a fluctuating load, which is related to a load applied to components of a wind turbine (e.g. a drive train connected to a wind turbine rotor, or a nacelle or a tower supporting the wind turbine rotor), and may be a cause of contact of a wind turbine blade with a tower or damage to a wind turbine blade or the like.

A wind-velocity distribution within a rotor plane is affected by a surrounding environment (e.g. terrain and arrangement of other wind turbine power generating apparatuses around the wind turbine power generating apparatus) of the wind turbine power generating apparatus. Thus, even if the wind velocity and the turbulence degree of wind velocity are constant, the load on the wind turbine blade or the fluctuating load may change depending on the wind direction.

In this regard, according to the above method (1), the threshold of the wind velocity or the index of turbulence degree of wind velocity is variable in accordance with wind direction, and thereby it is possible to select an operation mode in accordance with the wind direction more appropriately as compared to a case where thresholds of the wind velocity or the index of the turbulence degree of wind velocity are constant regardless of the wind direction. Accordingly, for example, for a particular wind direction which tends to be accompanied by strong wind shear in the rotor plane, it is possible to appropriately reduce a load or a fluctuating load on the wind turbine blade in the particular direction by setting a threshold of the wind velocity or the index of turbulence degree of wind velocity to be relatively small. Thus, it is possible to reduce loads applied to components of a wind turbine, and to appropriately suppress contact of the wind turbine blade with the tower and occurrence of damage to the wind turbine blade or the like. In contrast, for another wind direction which tends to be accompanied by less strong wind shear in the rotor plane, for instance, it is possible to increase the opportunity of power generation by the wind turbine power generating apparatus in the particular wind direction by setting a threshold of the wind velocity or the index of turbulence degree of wind velocity to be relatively larger.

(2) In some embodiments, in the above method (1), in the step of obtaining the wind velocity or the index of turbulence degree, at least the index of turbulence degree is obtained. The threshold of the index of turbulence degree is $k \times X_{th}$ (where $0 \leq k < 1$) when the wind direction is in a second range being at least a part of a range other than a first range, provided that the threshold of the index of turbulence degree is $X_{th}$ when the wind direction of the wind turbine power generating apparatus is in the first range.

Turbulence of a wind-velocity distribution within a rotor plane may vary depending on the wind direction (nacelle direction). In this regard, according to the above method (2), the threshold of the index of turbulence degree is $k \times X_{th}$ (where $0 \leq k < 1$), which is smaller than the threshold $X_{th}$ in the first range, when the wind direction is in the second range other than the first range. Thus, when the wind direction is in the second range, the load-suppressing operation mode can be selected even if the turbulence degree is relatively small as compared to when the wind direction is in the first range. Accordingly, the threshold $k \times X_{th}$ of the second range is set by multiplying the threshold $X_{th}$ in the first range by k, whereby it is possible to set a relatively smaller threshold in a wind-directional range (second range) where turbulence of a wind-velocity distribution within a rotor plane tends to be stronger, and thereby it is possible to select an operation mode of the wind turbine power generating apparatus even more appropriately.

(3) In some embodiments, in the above method (2), the second range is a range where turbulence of an air flow of a wind toward the wind turbine rotor is larger than in the first range, due to another wind turbine power generating apparatus disposed around the wind turbine power generating apparatus or terrain surrounding the wind turbine power generating apparatus.

According to the above method (3), the second range is a range where turbulence (e.g. occurrence of wind shear, diagonal flows, or swirls) of an air flow of a wind toward the wind turbine rotor is larger than in the first range, due to another wind turbine power generating apparatus disposed around the wind turbine power generating apparatus or terrain surrounding the wind turbine power generating apparatus. Thus, a relatively small threshold is set in the second range, where turbulence of an air flow of a wind toward the wind turbine rotor is relatively large, and thereby it is possible to select an operation mode of the wind turbine power generating apparatus more appropriately.

(4) In some embodiments, in any of the above methods (1) to (3), in the step of obtaining the wind velocity or the index of turbulence degree, both of the wind velocity and the index of turbulence degree are obtained. In the step of selecting an operation mode, one of the at least one load-suppressing operation mode is selected if at least one of the wind velocity or the index of turbulence degree is at least a threshold.

According to the above method (4), if the wind velocity is at least the threshold, or if at least one of indexes of turbulence degree of wind velocity is at least the threshold, a load-suppressing operation mode is selected. As described above, an operation mode is selected on the basis of a plurality of indexes related to a load or a fluctuating load on the wind turbine blade, and thereby it is possible to reduce a load applied to the wind turbine blade more effectively. Thus, it is possible to increase the opportunity of power generation by the wind turbine power generating apparatus while reducing loads applied to components of a wind turbine, and even more effectively suppressing contact of the wind turbine blade with the tower and occurrence of damage to the wind turbine blade or the like.

(5) In some embodiments, in any of the above methods (1) to (4), the method further comprises a step of obtaining a load applied to the wind turbine blade. In the step of selecting an operation mode, an operation mode of the wind turbine power generating apparatus is selected from among the plurality of operation modes also on the basis of whether the load is at least a threshold.

According to the above method (5), an operation mode of the wind turbine power generating apparatus is selected on the basis of whether the load applied to the wind turbine blade is at least a threshold, in addition to whether the wind velocity or the index of turbulence degree of the wind velocity is at least a threshold. As described above, an operation mode is selected on the basis of a plurality of indexes related to a load or a fluctuating load on the wind turbine blade and of the load applied to the wind turbine blade, and thereby it is possible to reduce a load applied to the wind turbine blade more effectively. Thus, it is possible to increase the opportunity of power generation by the wind turbine power generating apparatus while reducing loads applied to components of a wind turbine effectively, and even more effectively suppressing contact of the wind turbine blade with the tower and occurrence of damage to the wind turbine blade or the like.

(6) In some embodiments, in any of the above methods (1) to (5), in the step of obtaining the wind velocity or the index of turbulence degree, the wind velocity and the index of turbulence degree are obtained. In the step of selecting an operation mode, an operation mode of the wind turbine power generating apparatus is selected on the basis of whether at least the index of turbulence degree is at least a threshold. The threshold of the index of turbulence degree is variable in accordance with the wind velocity.

According to the above method (6), the threshold of the index of turbulence degree is variable in accordance with the wind velocity, whereby an operation mode is selected on the basis of the threshold of the index of turbulence degree of wind velocity corresponding to the combination of the wind velocity and the turbulence degree of wind velocity, and thereby it is possible to reduce the load applied to the wind turbine blade or the fluctuating load. Thus, it is possible to increase the opportunity of power generation by the wind turbine power generating apparatus while reducing loads applied to components of a wind turbine, and even more effectively suppressing contact of the wind turbine blade with the tower and occurrence of damage to the wind turbine blade or the like.

For instance, if the wind velocity is relatively small even though the turbulence of wind velocity is relatively large, or if the turbulence of wind velocity is relatively small even though the wind velocity is relatively large, the load on the wind turbine blade may be of such a level that does not affect contact of the wind turbine blade with the tower and occurrence of damage to the wind turbine blade or the like. In such a case, according to the above method (6), it is possible to select the normal operation mode without selecting a suppressing operation mode unnecessarily, and to improve the total power generation amount of the wind turbine power generating apparatus in such a case.

(7) In some embodiments, in the above method (6), the index of turbulence degree is a standard deviation of time-series data of the wind velocity. A threshold of the standard deviation of the wind velocity is expressed by different linear functions of the wind velocity in a first range where the wind velocity is less than a predetermined value and in a second range where the wind velocity is not less than the predetermined value. An intercept of the linear function of the wind velocity defining the threshold in the first range is greater than an intercept of the linear function of the wind velocity defining the threshold in the second range. A slope of the linear function of the wind velocity defining the threshold in the first range is negative, and a slope of the linear function of the wind velocity defining the threshold in the second range is positive.

According to the above method (7), an intercept of the linear function of the wind velocity defining the threshold in the first range is greater than an intercept of the linear function of the wind velocity defining the threshold in the second range. Furthermore, a slope of the linear function of the wind velocity defining the threshold in the first range is negative, and a slope of the linear function of the wind velocity defining the threshold in the second range is positive. Thus, when the threshold of the standard deviation is converted into the threshold of the turbulence intensity of the wind velocity that more directly affects the fluctuating load on the wind turbine blade (=(standard deviation of time-series data of wind velocity)/(mean of time-series data of wind velocity)), the threshold rapidly increases with a decrease in the wind velocity in the first range, which is a relatively low wind-velocity range, and slowly decreases with an increase in the wind velocity in the second range, which is a relatively high wind-velocity range.

Thus, in the first range being a relatively low wind-velocity range, the threshold of turbulence intensity rapidly increases with a decrease in the wind velocity, and thus the opportunity to select the normal operation mode at a low wind velocity increases, which makes it possible to ensure a power generation amount of the wind turbine power generating apparatus. Furthermore, in the second range being a relatively high wind-velocity range, the threshold of turbulence intensity gradually decreases with an increase in the wind velocity, and thus the opportunity to select a load-suppressing operation mode at a high wind velocity increases, which makes it possible to appropriately suppress contact of the wind turbine blade with the tower and occurrence of damage to the wind turbine blade or the like.

(8) In some embodiments, in any of the above methods (1) to (7), in the at least one load-suppressing operation mode, the load is suppressed more than in the normal operation mode, by reducing a rotation speed of the wind turbine rotor or by changing a pitch angle of the wind turbine blade to be closer to a feather side as compared to in an operation in the normal operation mode.

According to the above method (8), in the load-suppressing operation mode, the load applied to the wind turbine blade can be suppressed as compared to in the operation in the normal operation mode by reducing the rotation speed of the wind turbine rotor or by changing the pitch angle of the wind turbine blade to be closer to the feather side than in the operation in the normal operation mode. Thus, it is possible to reduce loads applied to components of a wind turbine, and to increase the opportunity of power generation by the wind turbine power generating apparatus while suppressing contact of the wind turbine blade with the tower and occurrence of damage to the wind turbine blade or the like.

(9) In some embodiments, in any of the above methods (1) to (8), the at least one load-suppressing operation mode includes a first load suppressing operation mode, and a second load suppressing operation mode in which the load is suppressed more than in the first load suppressing operation mode by reducing a rotation speed of the wind turbine rotor or by changing a pitch angle of the wind turbine blade to be closer to a feather side as compared to in the first load suppressing operation mode.

According to the above method (9), the load-suppressing operation mode includes the first load-suppressing operation mode and the second load-suppressing operation mode in which the load is suppressed more than in the first load-suppressing operation mode. Providing a plurality of load-suppressing operation modes makes it possible to suppress the load on the wind turbine blade in stages in accordance with the load on the wind turbine blade and the rotation speed of the wind turbine rotor or the pitch angle of the wind turbine blade, thus increasing the opportunity of power generation of the wind turbine power generating apparatus.

(10) A wind turbine power generating apparatus according to at least one embodiment of the present invention comprises: a wind turbine rotor comprising a wind turbine blade; a wind-direction sensor for obtaining a wind direction of a wind received by the wind turbine rotor; a wind-velocity sensor for obtaining a wind velocity of the wind received by the wind turbine rotor; and an operation-mode selecting part configured to select an operation mode of the wind turbine power generating apparatus from among a plurality of operation modes including a normal operation mode and at least one load-suppressing operation mode in which a load applied to the wind turbine blade is smaller than in the normal operation mode, on the basis of whether at least one of the wind velocity obtained by the wind-velocity sensor or an index of turbulence degree of the wind velocity calculated from the wind velocity is at least a threshold. The threshold of the at least one of the wind velocity or the index of turbulence degree is variable in accordance with the wind direction obtained by the wind-direction sensor.

A wind velocity and a turbulence degree of wind velocity are each an index of a load on a wind turbine blade or a fluctuating load, which is related to a load applied to components of a wind turbine (e.g. a drive train connected to a wind turbine rotor, or a nacelle or a tower supporting the wind turbine rotor), and may be a cause of contact of a wind turbine blade with a tower or damage to a wind turbine blade or the like.

A wind-velocity distribution within a rotor plane is affected by a surrounding environment (e.g. terrain and arrangement of other wind turbine power generating apparatuses around the wind turbine power generating apparatus) of the wind turbine power generating apparatus. Thus, even if the wind velocity and the turbulence degree of wind velocity are constant, the load on the wind turbine blade or the fluctuating load may change depending on the wind direction.

In this regard, according to the above configuration (10), the threshold of the wind velocity or the index of turbulence degree of wind velocity is variable in accordance with wind direction, and thereby it is possible to select an operation mode in accordance with the wind direction more appropriately as compared to a case where thresholds of the wind velocity or the index of turbulence degree of wind velocity are constant regardless of the wind direction. Accordingly, for example, for a particular wind direction which tends to be accompanied by strong wind shear in the rotor plane, it is possible to appropriately reduce a load or a fluctuating load on the wind turbine blade in the particular direction by setting the threshold of the wind velocity or the index of turbulence degree of wind velocity to be relatively small. Thus, it is possible to reduce loads applied to components of a wind turbine, and to appropriately suppress contact of the wind turbine blade with the tower and occurrence of damage to the wind turbine blade or the like. On the other hand, for another wind direction which tends to be accompanied by less strong wind shear in the rotor plane, for instance, it is possible to increase the opportunity of power generation by the wind turbine power generating apparatus in the particular wind direction by setting thresholds of the wind velocity or the index of turbulence degree of wind velocity to be relatively larger.

(11) In some embodiments, in the above configuration (10), the threshold of the index of turbulence degree is $k \times X_{th}$ (where $0 \leq k < 1$) when the wind direction is in a second range being least a part of a range other than a first range, provided that the threshold of the index of turbulence degree is $X_{th}$ when the wind direction of the wind turbine power generating apparatus is in the first range.

Turbulence of an air flow of a wind-velocity distribution within a rotor plane may vary depending on the wind direction (nacelle direction). In this regard, according to the above method (11), the threshold of the index of turbulence degree is $k \times X_{th}$ (where $0 \leq k < 1$) when the wind direction is in the second range other than the first range. Thus, when the wind direction is in the second range, the load-suppressing operation mode can be selected even if the turbulence degree is relatively small, as compared to when the wind direction is in the first range. Accordingly, the threshold $k \times X_{th}$ of the second range is set by multiplying the threshold $X_{th}$ in the first range by k, whereby it is possible to set a relatively smaller threshold in a wind-directional range (second range) where turbulence of a wind-velocity distribution within a rotor plane tends to be stronger, and thereby it is possible to select an operation mode of the wind turbine power generating apparatus even more appropriately.

(12) In some embodiments, in the above configuration (11), the second range is a range where turbulence of an air flow of a wind toward the wind turbine rotor is larger than in the first range, due to another wind turbine power generating apparatus disposed around the wind turbine power generating apparatus or terrain surrounding the wind turbine power generating apparatus.

According to the above configuration (12), the second range is a range where turbulence (e.g. occurrence of wind shear, diagonal flows, or swirls) of an air flow of a wind toward the wind turbine rotor is larger than in the first range, due to another wind turbine power generating apparatus disposed around the wind turbine power generating apparatus or terrain surrounding the wind turbine power generating apparatus. Thus, a relatively small threshold is set in the second range, where turbulence of an air flow of a wind toward the wind turbine rotor is relatively large, and thereby it is possible to select an operation mode of the wind turbine power generating apparatus more appropriately.

(13) In some embodiments, in any one of the above configurations (10) to (12), the operation-mode selecting part is configured to select an operation mode of the wind turbine power generating apparatus on the basis of whether at least the index of turbulence degree is at least a threshold. The threshold of the index of turbulence degree is variable in accordance with the wind velocity.

According to the above configuration (13), the threshold of the index of turbulence degree is variable in accordance with the wind velocity, whereby an operation mode is selected on the basis of the threshold of the index of turbulence degree of wind velocity corresponding to the combination of the wind velocity and the turbulence degree of wind velocity, and thereby it is possible to reduce the load applied to the wind turbine blade or the fluctuating load. Thus, it is possible to increase the opportunity of power generation by the wind turbine power generating apparatus while reducing loads applied to components of a wind turbine and even more effectively suppressing contact of the wind turbine blade with the tower and occurrence of damage to the wind turbine blade or the like.

For instance, if the wind velocity is relatively small even though the turbulence of wind velocity is relatively large, or if the turbulence of wind velocity is relatively small even though the wind velocity is relatively large, the load on the wind turbine blade may be of such a level that does not affect contact of the wind turbine blade with the tower and occurrence of damage to the wind turbine blade or the like. In such a case, according to the above configuration (13), it is possible to select the normal operation mode without selecting a suppressing operation mode unnecessarily, and to improve the total power generation amount of the wind turbine power generating apparatus.

(14) In some embodiments, in any of the above configurations (10) to (13), the wind turbine power generating apparatus further comprises an operation control part for controlling operation of the wind turbine power generating apparatus on the basis of the operation mode. The operation control part is configured to, in the at least one load-suppressing operation mode, suppress the load more than in the normal operation mode by reducing a rotation speed of the wind turbine rotor or by changing a pitch angle of the wind turbine blade to be closer to a feather side as compared to in an operation in the normal operation mode.

With the above configuration (14), in the load-suppressing operation mode, the load applied to the wind turbine blade can be suppressed as compared to in the operation in the normal operation mode by reducing the rotation speed of the wind turbine rotor or by changing the pitch angle of the wind turbine blade to be closer to the feather side than in the operation in the normal operation mode. Thus, it is possible to increase the opportunity of power generation by the wind turbine power generating apparatus while reducing loads applied to components of a wind turbine and suppressing contact of the wind turbine blade with the tower and occurrence of damage to the wind turbine blade or the like.

(15) In some embodiments, in any of the above configurations (10) to (14), the at least one load-suppressing operation mode includes a first load suppressing operation mode, and a second load suppressing operation mode in which the load is suppressed more than in the first load suppressing operation mode by reducing a rotation speed of the wind turbine rotor or by changing a pitch angle of the wind turbine blade to be closer to a feather side as compared to in the first load suppressing operation mode.

With the above configuration (15), the load-suppressing operation mode includes the first load-suppressing operation mode and the second load-suppressing operation mode in which the load is suppressed more than in the first load-suppressing operation mode. Providing a plurality of load-suppressing operation modes makes it possible to suppress the load on the wind turbine blade in stages in accordance with the load on the wind turbine blade and the rotation speed of the wind turbine rotor or the pitch angle of the wind turbine blade, and to increase the opportunity of power generation of the wind turbine power generating apparatus.

According to at least one embodiment of the present invention, provided is a method of operating a wind turbine power generating apparatus whereby it is possible to more appropriately reduce loads to be applied to components of a wind turbine.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

An over-all configuration of a wind turbine power generating apparatus to which an operation method according to some embodiments is to be applied will be described.

Figure 1:
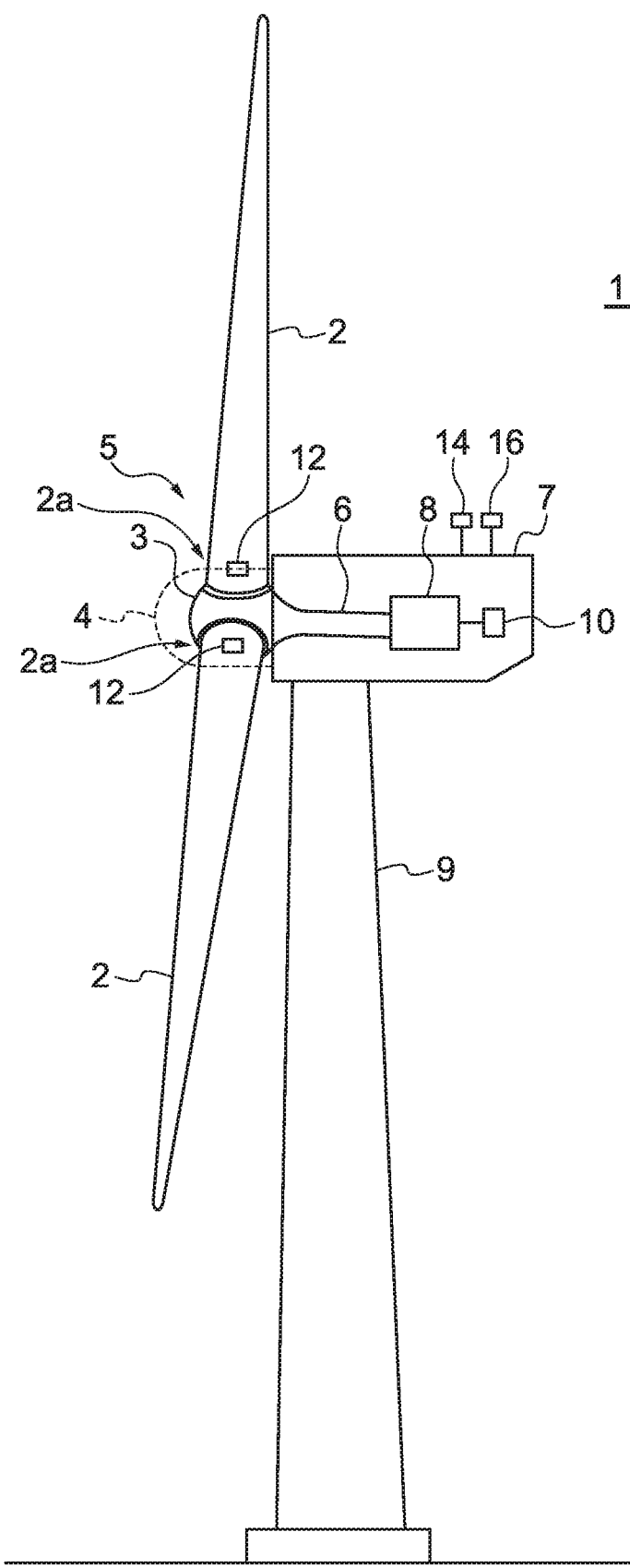
FIG. 1 is a schematic configuration diagram of a wind turbine power generating apparatus according to an embodiment.

FIG. 1 is a schematic configuration diagram of a wind turbine power generating apparatus according to an embodiment. As depicted in the drawing, a wind turbine power generating apparatus 1 includes a wind turbine rotor 5 including at least one wind turbine blade 2 and a hub 3, a main shaft 6 coupled to the hub 3, and a generator 10 driven by rotational energy of the wind turbine rotor 5. The main shaft 6 and the generator 10 are connected to each other via the drive train 8, and rotational energy of the wind turbine rotor 5 is transmitted to the generator 10 via the main shaft 6 and the drive train 8.

Furthermore, the wind turbine power generating apparatus 1 includes a nacelle 7 for housing equipment including the main shaft 6, the drive train 8, and the generator 10, and a tower 9 to support the nacelle 7. The wind turbine rotor 5 is supported rotatably by the nacelle 7. The hub 3 may be covered with a spinner (hub cover) 4.

The wind turbine power generating apparatus 1 may be an offshore wind turbine power generating apparatus installed on ocean, or an onshore wind turbine power generating apparatus installed on land.

The wind turbine power generating apparatus 1 further includes a load sensor 12 for obtaining loads (blade loads) applied to the wind turbine blade 2.

The load sensor 12 includes, for instance, a strain sensor mounted to a blade root portion 2a of the wind turbine blade 2, and may be configured to calculate loads applied to the wind turbine blade 2 on the basis of strain data obtained by the strain sensor. It should be noted that, the blade root portion 2a of the wind turbine blade 2 is a structural portion constituting an end portion of the wind turbine blade 2 on the side of the hub 3, which receives a bending moment transmitted from the wind turbine blade 2 to the hub 3.

In a case where the wind turbine rotor 5 includes a plurality of wind turbine blades 2, the load sensor 12 may be disposed on each of the plurality of wind turbine blades 2 and configured to obtain loads that act on the respective wind turbine blades 2.

The wind turbine power generating apparatus 1 includes a wind-direction sensor 16 and a wind-velocity sensor 14 for obtaining the wind direction and wind velocity, respectively, of wind received by the wind turbine rotor 5. The wind-direction sensor 16 and the wind-velocity sensor 14 may be mounted to the nacelle 7.

Figure 2:
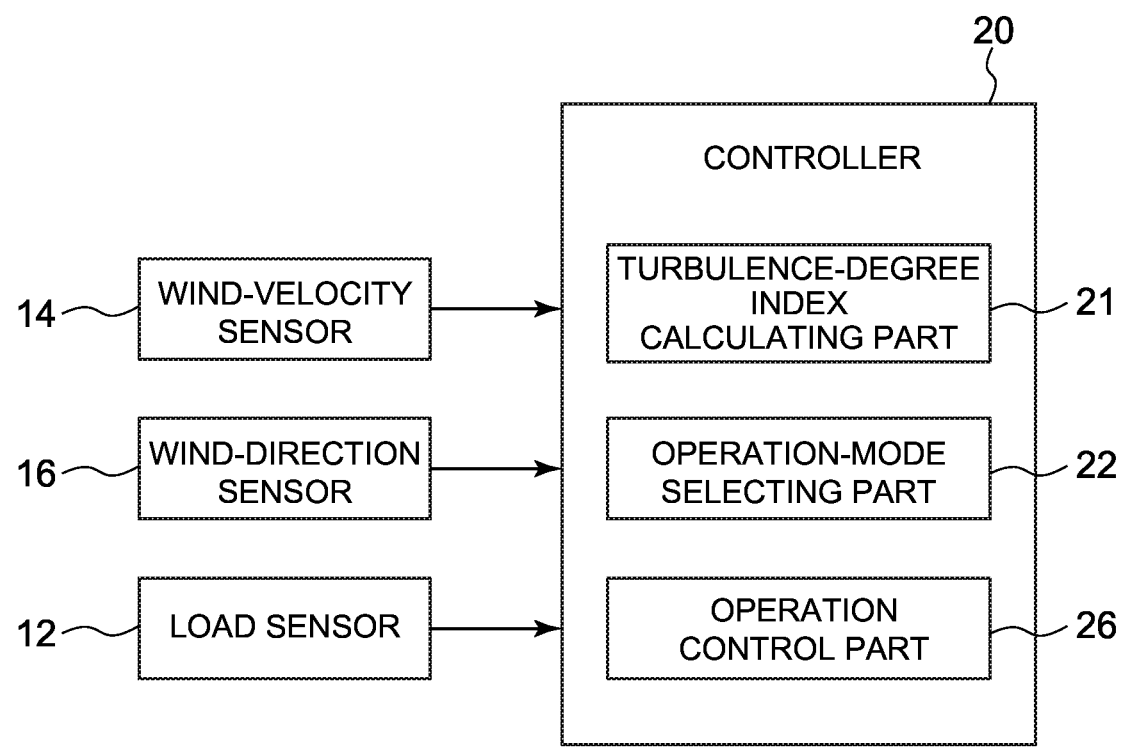
FIG. 2 is a configuration diagram of a controller of a wind turbine power generating apparatus according to an embodiment.

FIG. 2 is a configuration diagram of a controller of a wind turbine power generating apparatus according to an embodiment.

The wind turbine power generating apparatus 1 further includes a controller 20 for controlling operation of the wind turbine power generating apparatus 1. As depicted in FIG. 2, the controller 20 according to an embodiment includes a turbulence-degree index calculating part 21, an operation-mode selecting part 22, and an operation control part 26.

The turbulence-degree index calculating part 21 is configured to calculate an index of turbulence degree of wind velocity on the basis of the wind velocity obtained by the wind-velocity sensor 14. The index of turbulence degree of wind velocity will be described below.

The operation-mode selecting part 22 is configured to select an operation mode of the wind turbine power generating apparatus 1 from among a plurality of operation modes, on the basis of a wind velocity of wind received by the wind turbine rotor 5 obtained by the wind-velocity sensor 14, an index of turbulence degree calculated by the turbulence-degree index calculating part 21, or a blade-load degree obtained by the load sensor 12.

The operation control part 26 is configured to control operation of the wind turbine power generating apparatus 1 on the basis of the operation mode selected by the operation-mode selecting part 22.

Next, a method of operating a wind turbine power generating apparatus according to some embodiments will be described, where the method is applied to the above described wind turbine power generating apparatus 1, for example.

Figure 3:
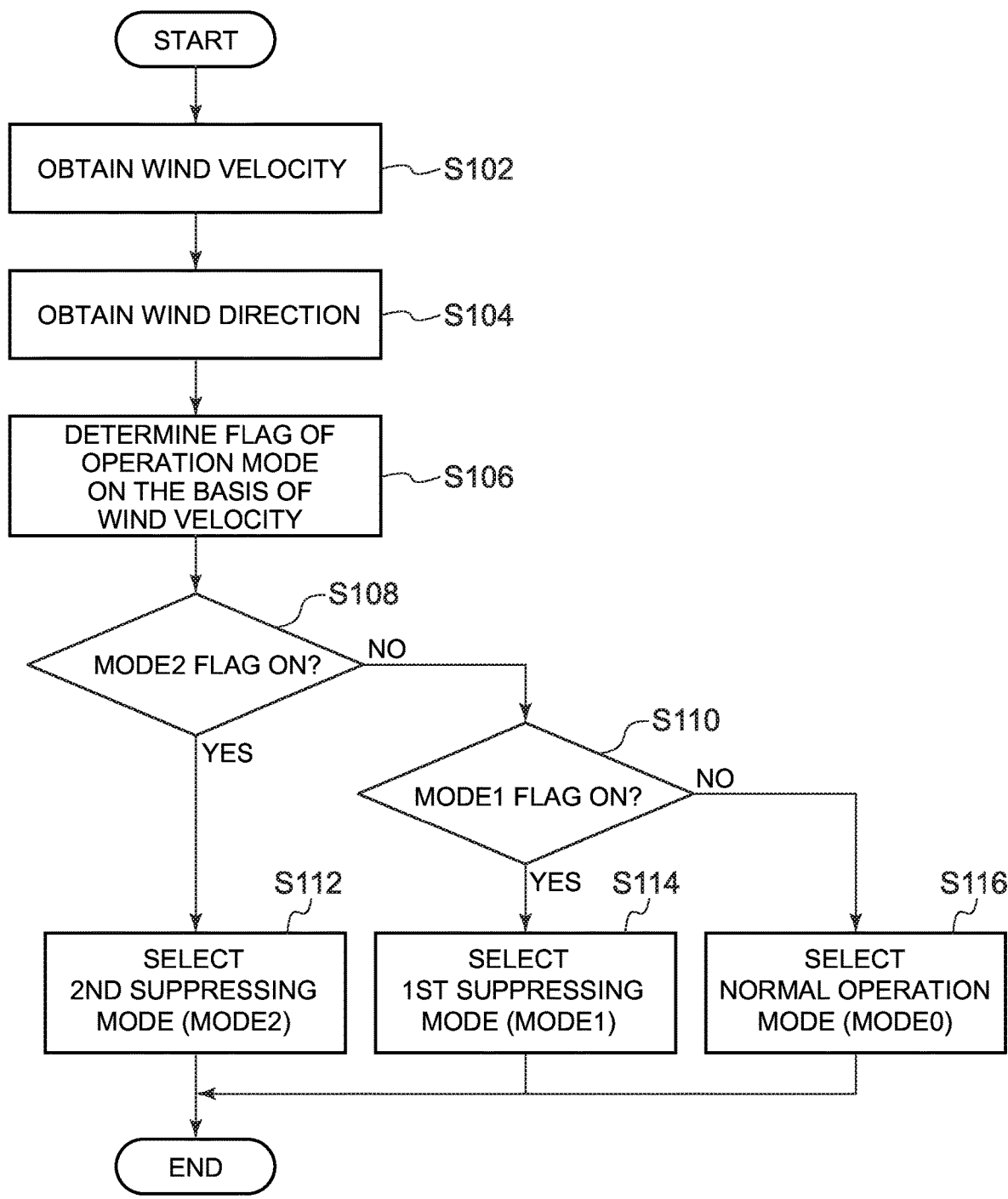
FIG. 3 is a flowchart of a method of operating a wind turbine power generating apparatus according to an embodiment.
Figure 4:
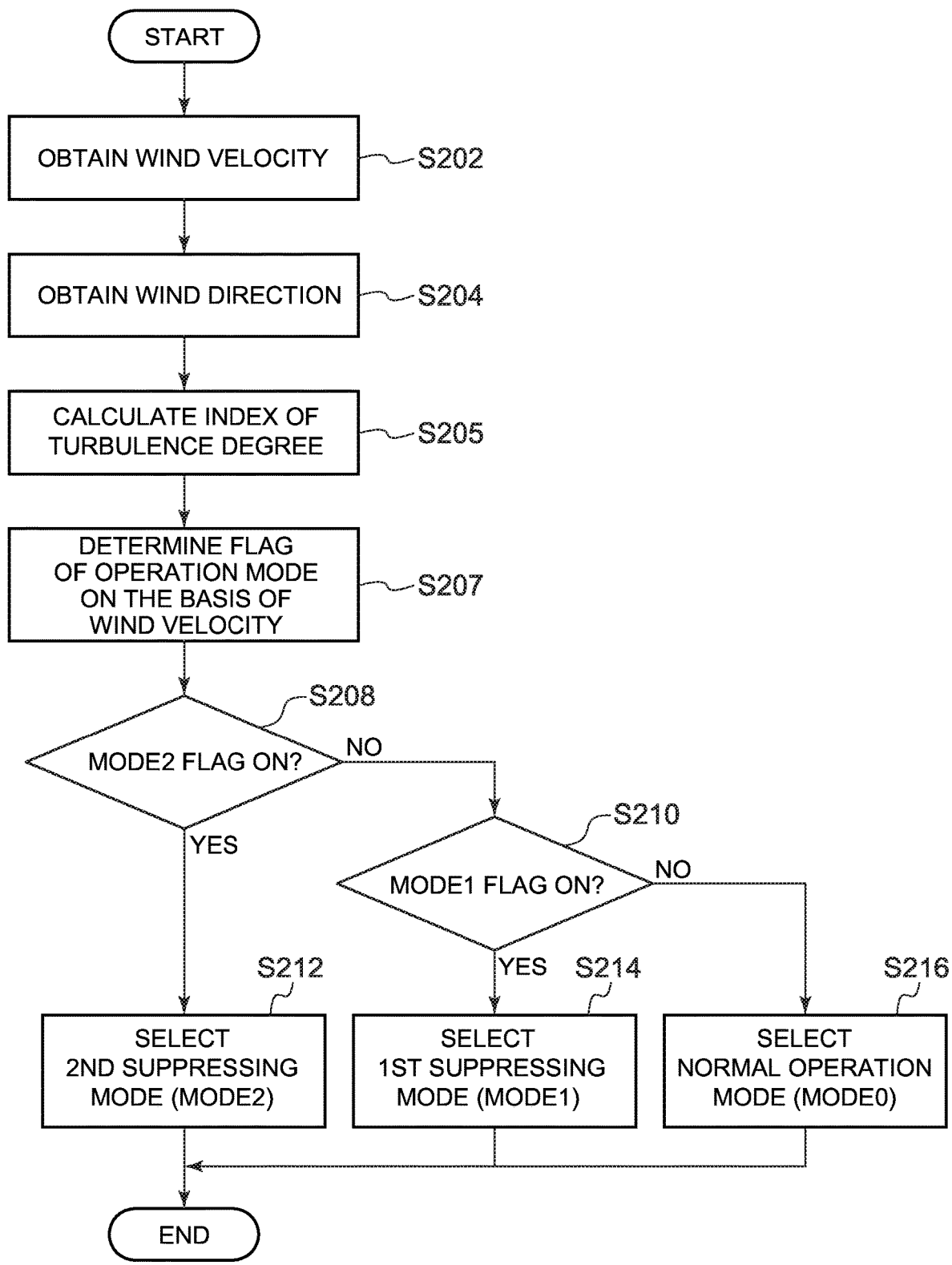
FIG. 4 is a flowchart of a method of operating a wind turbine power generating apparatus according to an embodiment.

FIGS. 3 and 4 are each a flowchart of a method of operating a wind turbine power generating apparatus according to an embodiment.

A method of operating a wind turbine power generating apparatus shown in the flowchart of in FIG. 3 includes a step of obtaining a wind velocity V of wind received by the wind turbine rotor 5 (S102), a step of obtaining a wind direction of wind received by the wind turbine rotor 5 (S104), and steps of selecting an operation mode of the wind turbine power generating apparatus 1 on the basis of whether the wind velocity V obtained in step S102 is at least a threshold (S106 to S116). The threshold of the wind velocity V is variable in accordance with the wind direction. The wind turbine power generating apparatus 1 is operated in the operation mode selected in steps S106 to S116.

A method of operating a wind turbine power generating apparatus shown in the flowchart of FIG. 4 includes a step of obtaining a wind velocity V of wind received by the wind turbine rotor 5 (S202), a step of obtaining a wind direction of wind received by the wind turbine rotor 5 (S204), a step of obtaining an index I of turbulence degree of wind velocity on the basis of the wind velocity V obtained in step S202, and steps of selecting an operation mode of the wind turbine power generating apparatus 1 on the basis of whether the index I of turbulence degree calculated in step S205 is at least a threshold (S208 to S216). Here, the threshold of the index I of turbulence degree is variable in accordance with the wind direction. The wind turbine power generating apparatus 1 is operated in the operation mode selected in steps S208 to S216.

In the above described step of obtaining the wind velocity V (S102 or S202), the wind-velocity sensor 14 may be used to obtain the wind velocity V of wind received by the wind turbine rotor 5. In the above described step of obtaining the wind direction (S104 or S204), the wind-direction sensor 16 may be used to obtain the wind direction of wind received by the wind turbine rotor 5.

In the above described step of obtaining the index I of turbulence degree of wind velocity (S205), the index I of turbulence degree of wind velocity may be calculated on the basis of the wind velocity obtained in step S202 by the turbulence-degree index calculating part 21.

Furthermore, the steps of selecting an operation mode of the wind turbine power generating apparatus 1 (S106 to S116 or S208 to S216) may be performed by the operation-mode selecting part 22.

In the steps of selecting an operation mode of the wind turbine power generating apparatus 1 (S104 to S116 or S114 to S216), the operation-mode selecting part 22 selects an operation mode of the wind turbine power generating apparatus 1 from among a plurality of operation modes including a normal operation mode (Mode0), and at least one load-suppressing operation modes (Mode1, Mode 2, . . . ) in which smaller loads are applied to the wind turbine blade 2 than in the normal operation mode (i.e., loads are more suppressed). In the operation method depicted in the flowchart of FIGS. 3 and 4, in the steps of selecting an operation mode, an operation mode of the wind turbine power generating apparatus 1 is selected from among three operation modes including the normal operation mode (Mode0), the first load-suppressing operation mode (Mode1) in which smaller loads are applied to the wind turbine blade 2 than in the normal operation mode (Mode0), and the second load-suppressing operation mode (Mode2) in which even smaller loads are applied to the wind turbine blade 2 than in the first load-suppressing operation mode (Mode1).

In another embodiment, in the steps of selecting an operation mode of the wind turbine power generating apparatus 1, an operation mode of the wind turbine power generating apparatus 1 may be selected from two operation modes including the normal operation mode (Mode0) and the above mentioned first load-suppressing operation mode (Mode1). Alternatively, in another embodiment, in the steps of selecting an operation mode, an operation mode of the wind turbine power generating apparatus 1 may be selected from four or more operation modes including the normal operation mode (Mode0), the above mentioned first load-suppressing operation mode (Mode1), the above mentioned second load-suppressing operation mode (Mode2), and another one or more load-suppressing operation mode (Mode 3 . . . ). Furthermore, operation modes of the wind turbine power generating apparatus 1 may include a stop mode of stopping operation of the wind turbine power generating apparatus 1 in a wind condition more harsh than a condition in which a load-suppressing operation mode is selected.

Hereinafter, the first load-suppressing operation mode and the second load-suppressing operation mode may be referred to as the first suppressing mode and the second suppressing mode, respectively.

The steps of selecting an operation mode of the wind turbine power generating apparatus 1 (S106 to S116 or S207 to S216) will be described in more detail.

In the steps of selecting an operation mode, the operation-mode selecting part 22 determines whether conditions for setting a flag for each operation mode are satisfied, on the basis of the wind velocity V obtained in step S102, or on the basis of the index I of turbulence degree obtained in step S205, and turns ON a flag of an operation mode whose conditions are satisfied (S106 or S207).

Furthermore, the operation-mode selecting part 22 selects an operation mode corresponding to the flag of an operation mode that is turned ON in step S106 or S207 (S108 to S116, or S208 to S216). For instance, with reference to the flowchart of FIG. 3, if the flag of the second suppressing mode (Mode2) is turned ON in step S106 (YES in S108), the second suppressing mode is selected (S112). If the flag of the first suppressing mode (Mode1) is turned ON in step S106 (NO in S108 and YES in S110), the first suppressing mode is selected (S114). Alternatively, if the flag of the normal operation mode (Mode0) is turned ON in step S106 (NO in S108 and NO in S110), the normal operation mode is selected (S116). A similar explanation can be applied to the operation method shown in the flowchart of FIG. 4.

Accordingly, in steps S106 to S116 or S207 to S216, from among the normal operation mode (Mode0), the first suppressing mode (Mode1), and the second suppressing mode (Mode2), a flag of an operation mode whose conditions for setting a flag are satisfied is turned ON, and the operation mode corresponding to the flag is selected.

In the steps of selecting an operation mode (S106 to S116 or S207 to S216), the operation-mode selecting part 22 selects a load-suppressing operation mode (the first suppressing mode or the second suppressing mode), if the wind velocity V obtained in step S102 is at least a threshold, or if the index I of turbulence degree calculated in step S205 is at least a threshold. Specifically, in step S106 or S207, the operation-mode selecting part 22 turns ON a flag of a load-suppressing operation mode (the first suppressing mode or the second suppressing mode), if the wind velocity V obtained in step S102 is at least a threshold, or if the index I of turbulence degree calculated in step S205 is at least a threshold.

Figure 5:
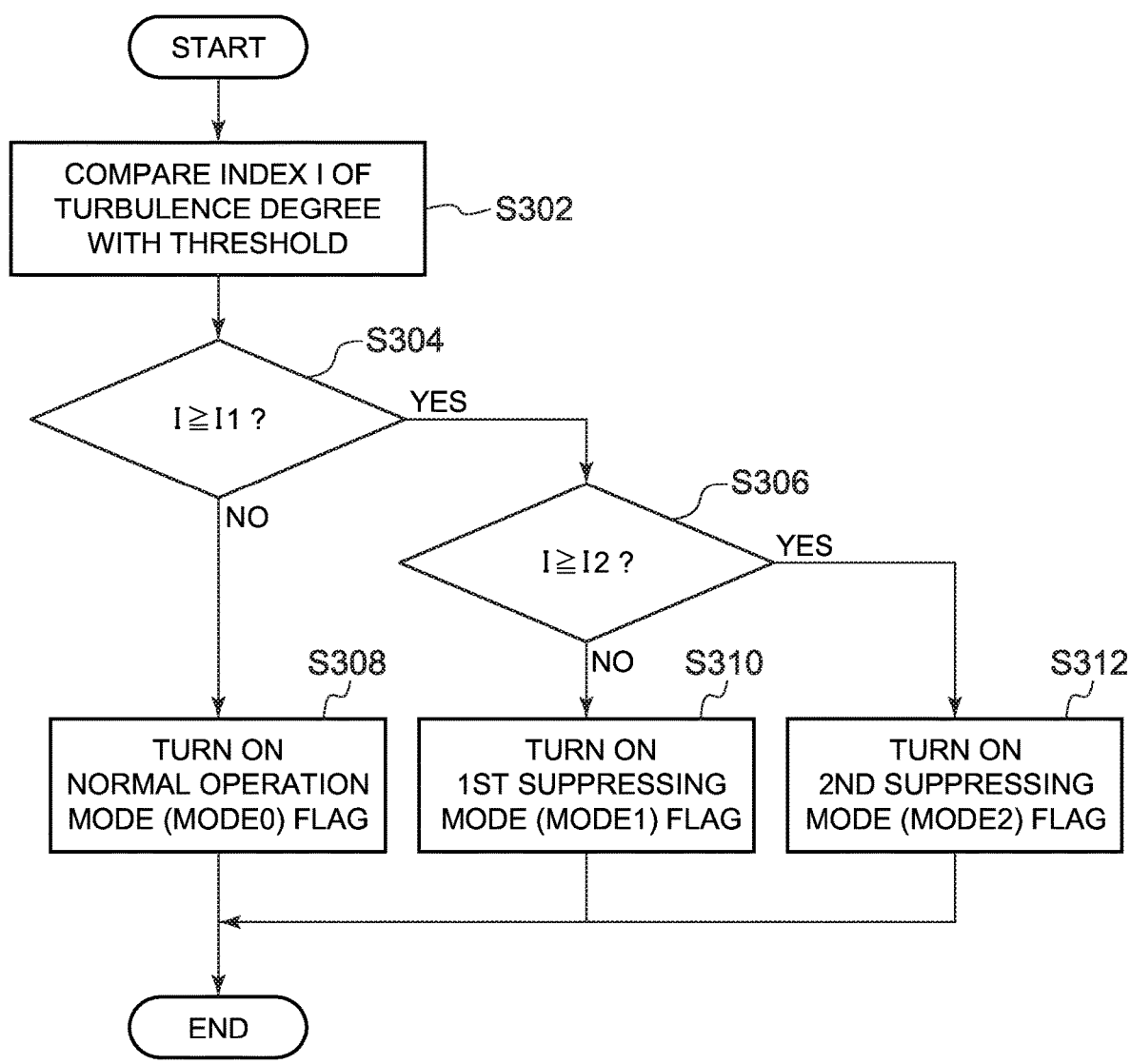
FIG. 5 is a flowchart of steps for determining an operation mode according to an embodiment.

The step S207 of determining an operation mode according to the embodiment depicted in FIG. 4 will now be described with reference to FIG. 5. FIG. 5 is a flowchart of the step of determining an operation mode (S207) according to an embodiment.

In an embodiment, in the step of determining an operation mode (S207), the operation-mode selecting part 22 compares the index I of turbulence degree (the index I of turbulence degree obtained in step S205) to a threshold (S302), and turns ON a flag of one of the load-suppressing operation modes if the index I of turbulence degree is at least the threshold, or turns ON a flag of the normal operation mode if the index I of turbulence degree is less than the threshold (S304 to S312).

More specifically, the operation-mode selecting part 22 compares the index I of turbulence degree with a threshold I1 (S304), and if the index I of turbulence degree is less than the threshold I1 (NO in S304), turns ON the flag of the normal operation mode (S308). On the other hand, if the index I of turbulence degree in step S304 is at least the threshold I1 (YES in S304), the operation-mode selecting part 22 further compares the index I of turbulence degree to a threshold I2 (where I2>I1) (S306), and if the index I of turbulence degree is less than the threshold I2 (NO in S306), turns ON the flag of the first suppressing mode (S310), and if the index I of turbulence degree is at least the threshold I2 (YES in S306), turns ON the flag of the second suppressing mode (S312).

The step S106 of determining an operation mode according to the embodiment shown in the flowchart of FIG. 3 can be described similarly to the above, except that the wind velocity V (wind velocity V obtained in step S102) is compared to the threshold instead of the index of turbulence degree.

In some embodiments, in the load-suppressing operation mode, the rotation speed of the wind turbine rotor 5 (rotor rotation speed) is reduced as compared to in operation in the normal operation mode, and thereby the load applied to the wind turbine blade 2 is suppressed more than in operation in the normal operation mode.

For instance, if the target rotation speed (rpm) is $\Omega_0$ in the normal operation mode, the target rotation speed may be $\Omega_1$ (where $\Omega_1<\Omega_0$) in the load-suppressing operation mode.

In an embodiment provided with a plurality of load-suppressing operation modes including the first suppressing mode and the second suppressing mode, the rotation speed of the wind turbine rotor 5 may be set to be lower in the second suppressing mode than in the first suppressing mode, so that loads applied to the wind turbine blade 2 are more suppressed in the second suppressing mode than in the first suppressing mode.

For instance, with two (stages of) load-suppressing operation modes, the target rotation speed may be $\Omega_0$ in the normal operation mode, $\Omega_1$ (where $\Omega_1<\Omega_0$) in the first load-suppressing operation mode, and $\Omega_2$ (where $\Omega_2<\Omega_1$) in the second load-suppressing operation mode.

In some embodiments, in the load-suppressing operation mode, the load applied to the wind turbine blade 2 may be suppressed more than in operation in the normal operation mode by changing the pitch angle of the wind turbine blade 2 to be closer to the feather side than in operation in the normal operation mode. The operation method according to this embodiment can be applied to, for instance, a wind turbine power generating apparatus with a wind turbine rotor and a generator directly coupled to each other and not via a drive train, the wind turbine rotor having a fixed rotation speed.

In an embodiment with a plurality of load-suppressing operation modes including the first suppressing mode and the second suppressing mode, the pitch angle of the wind turbine blade 2 may be set to be closer to the feather side in the second suppressing mode than in the first suppressing mode, so as to suppress loads applied to the wind turbine blade 2 as compared to in the first suppressing mode.

Figure 6:
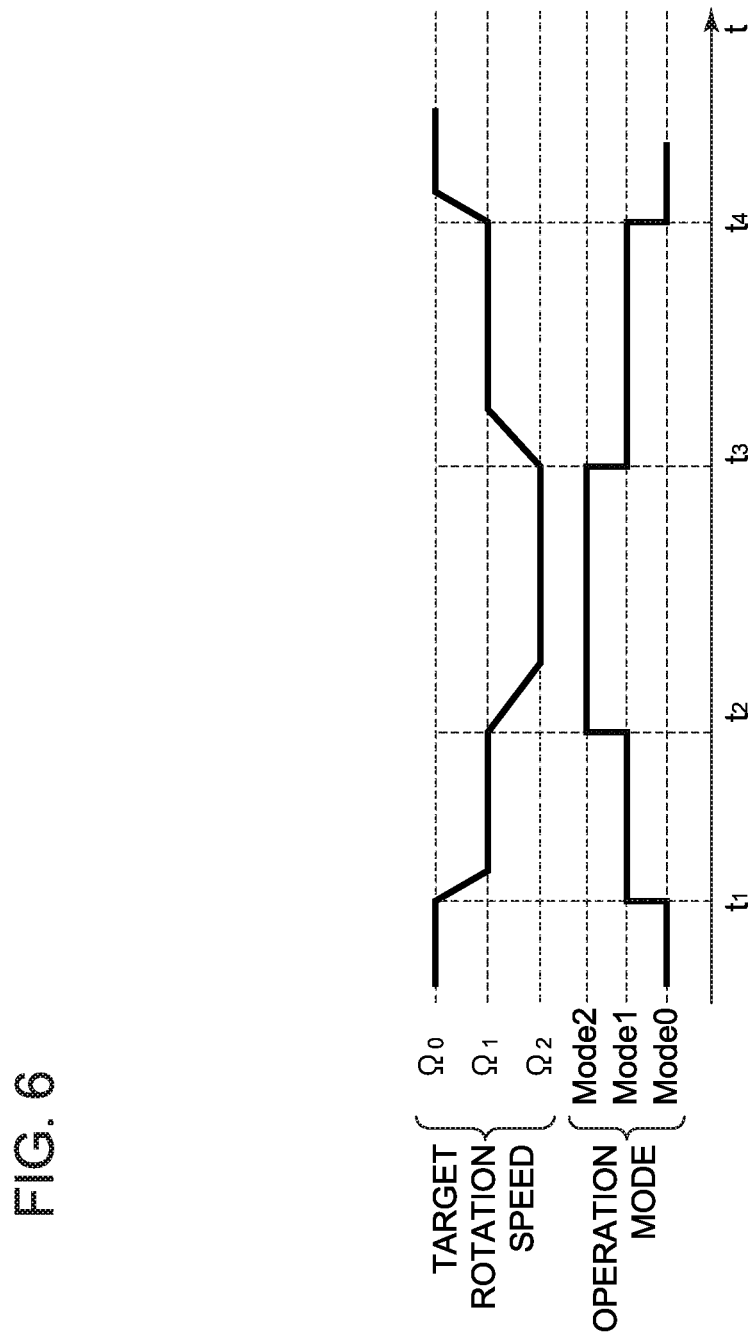
FIG. 6 is a graph showing a relationship between an operation mode and a rotor rotation speed of a wind turbine power generating apparatus according to an embodiment.

Described below with reference to FIG. 6 is an example of a change in the operation mode and the rotor rotation speed in a case where loads applied to the wind turbine blade 2 are suppressed by reducing the rotor rotation speed in a load-suppressing operation mode.

FIG. 6 is a graph showing a relationship between an operation mode and a rotor rotation speed (target rotation speed) of a wind turbine power generating apparatus according to an embodiment. In FIG. 6, x-axis is time t, and y-axis is the rotor rotation speed (target rotation speed) and the operation mode.

Before time t1, the wind turbine power generating apparatus 1 is operated in the normal operation mode (Mode0), where the rotor rotation speed (target rotation speed) is $\Omega_0$.

During operation in the normal operation mode, at time t1, in the above described steps S106 to S116 or steps S207 to S216, if a relationship I≥I1 is satisfied and the first suppressing mode (Mode 1) is selected, for instance, the target rotation speed is set to $\Omega_1$, and the operation control part 26 controls operation of the wind turbine power generating apparatus 1 so that the rotor rotation speed becomes $\Omega_1$.

During operation in the first suppressing mode, at time t2, in the above described steps S106 to S116 or steps S207 to S216, if a relationship I≥I2 is satisfied and the second suppressing mode (Mode2) is selected, for instance, the target rotation speed is set to $\Omega_2$, and the operation control part 26 controls operation of the wind turbine power generating apparatus 1 so that the rotor rotation speed becomes $\Omega_2$.

During operation in the second suppressing mode, at time t3, in the above described steps S106 to S116 or steps S207 to S216, if a relationship I<I2 is satisfied and the first suppressing mode is selected, for instance, the target rotation speed is set to $\Omega_1$, and the operation control part 26 controls operation of the wind turbine power generating apparatus 1 so that the rotor rotation speed becomes $\Omega_1$.

During operation in the first suppressing mode, at time t4, in the above described steps S106 to S116 or steps S207 to S216, if a relationship I<I1 is satisfied and the normal operation mode is selected, for instance, the target rotation speed is set to $\Omega_0$, and the operation control part 26 controls operation of the wind turbine power generating apparatus 1 so that the rotor rotation speed becomes $\Omega_0$.

A change rate (rpm/sec) of the rotor rotation speed may be varied between transition of the operation mode between the normal operation mode and the first suppressing mode, and transition of the operation mode between the first suppressing mode and the second suppressing mode.

For instance, the rotor rotation speed may be changed relatively quickly when the operation mode shifts between the normal operation mode and the first suppressing mode, and relatively slowly when the operation mode shifts between the first suppressing mode and the second suppressing mode.

The reason for the above is to suppress loads applied to the wind turbine blade 2 quickly by changing the normal operation mode relatively quickly to the first suppressing mode, and to protect components of the wind turbine power generating apparatus 1 by changing the first suppressing mode relatively slowly to the second suppressing mode.

In the present specification, when another operation mode is selected during operation of an operation mode, it may be expressed as "an operation mode shifts" from an operation mode to another operation mode, or "transition of an operation mode" from an operation mode to another operation mode.

Figure 7:
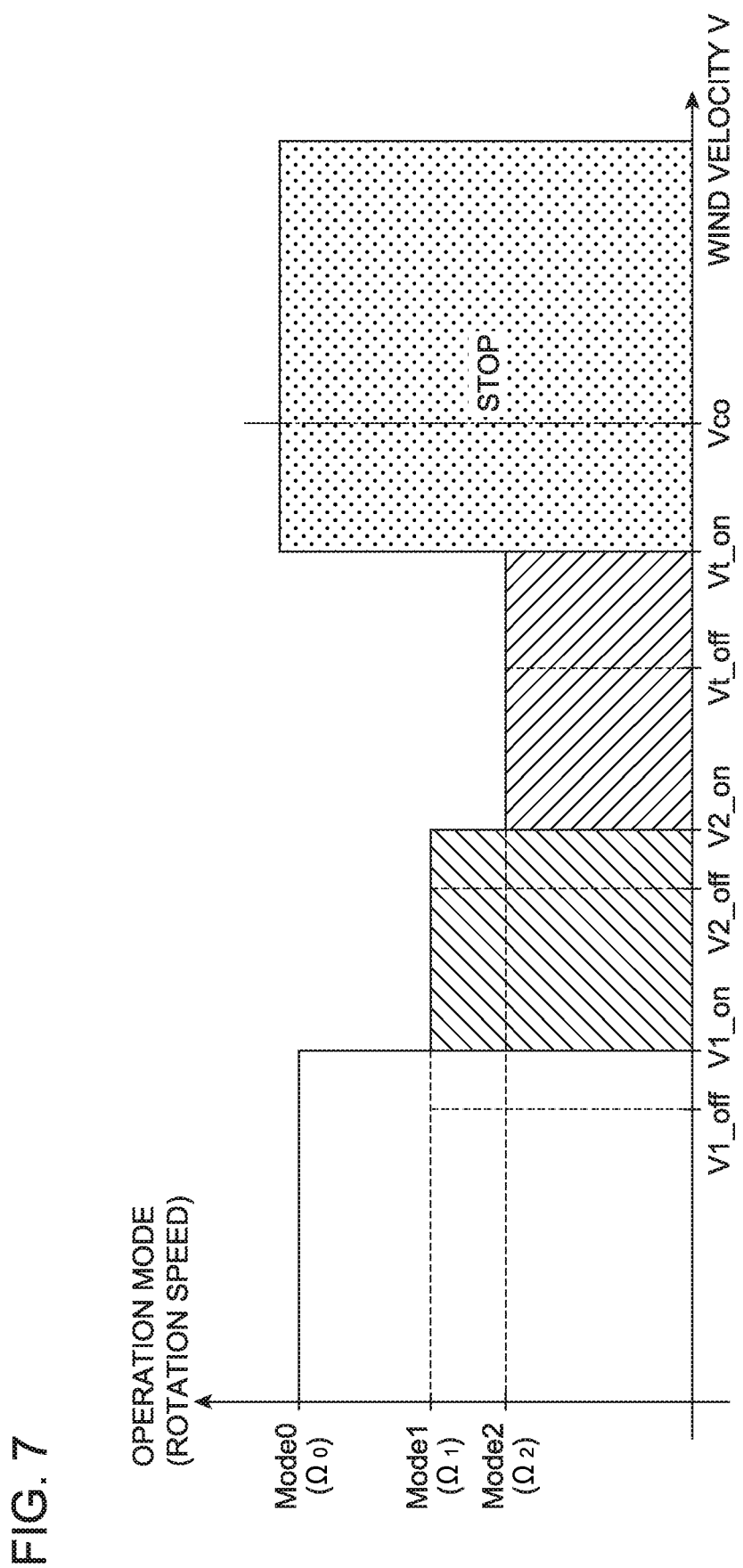
FIG. 7 is a diagram showing a relationship between a threshold of a wind velocity and an operation mode in an operation method according to an embodiment.
Figure 8:
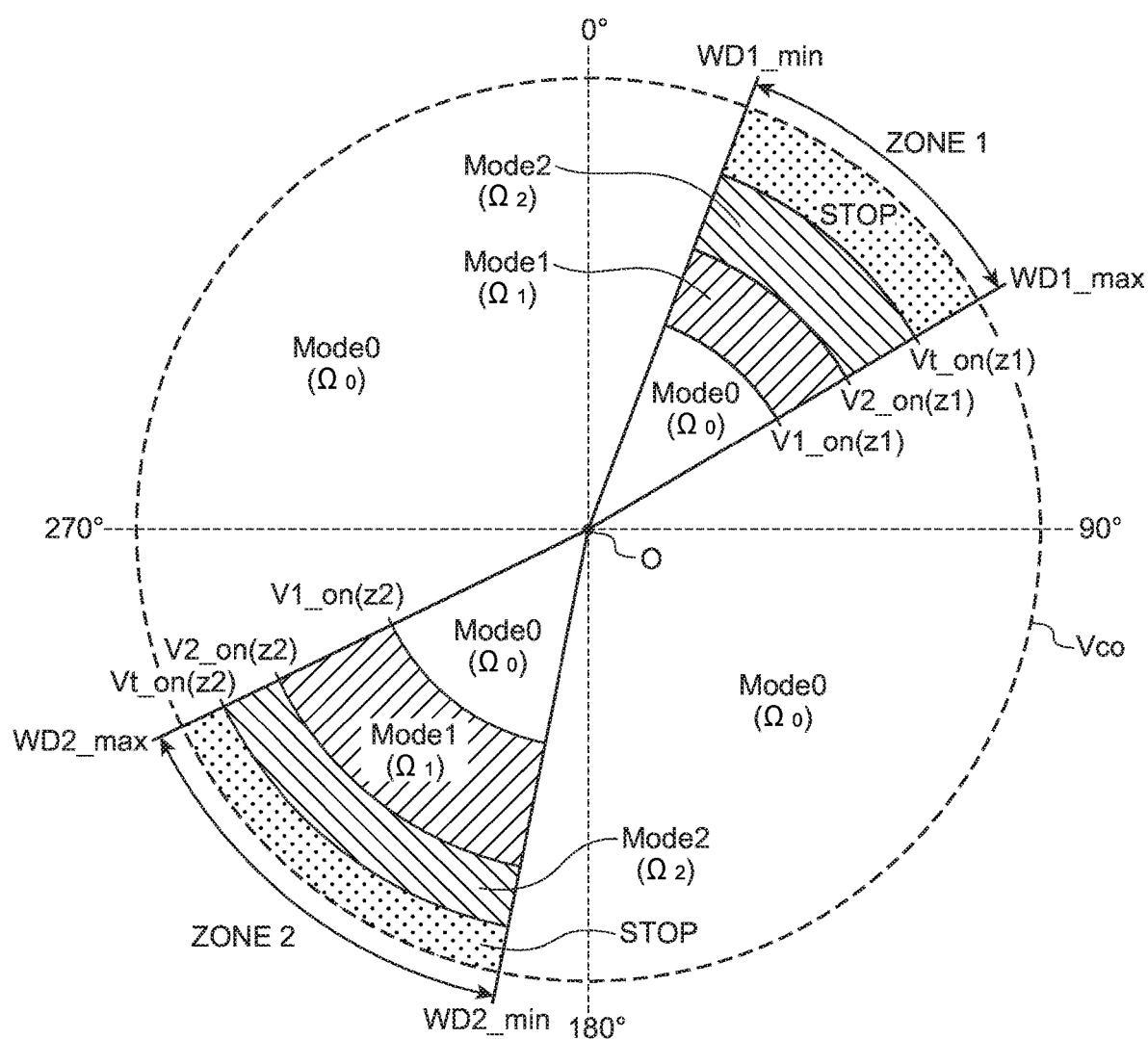
FIG. 8 is a diagram showing a relationship between a threshold of a wind velocity, an operation mode, and a wind direction, in an operation method according to an embodiment.

Next, with reference to FIGS. 7 and 8, described is setting a variable threshold of the wind velocity V in accordance with wind direction, in the method of operating the wind turbine power generating apparatus 1 according to some embodiments.

In some embodiments, the threshold of the wind velocity V is variable in accordance with wind direction in the operation method shown in the flowchart of FIG. 3 described above. Described below is a case in which the threshold of the wind velocity V is variable in accordance with wind direction, on the basis of the operation method shown in the flowchart of FIG. 3.

FIG. 7 is a diagram showing a relationship between a threshold of the wind velocity V and an operation mode in an operation method according to an embodiment. As depicted in FIG. 7, if the wind velocity V is less than the wind velocity V1_on, the wind turbine power generating apparatus 1 is operated in the normal operation mode (Mode0). When the wind velocity increases to reach V1_on or higher, the operation mode shifts to the first suppressing mode (Mode1). When the wind velocity further increases to reach V2_on or higher, the operation mode shifts to the second suppressing mode (Mode2).

Specifically, in the step S106 (see FIG. 3) of determining a flag of an operation mode on the basis of wind velocity, to determine whether to select an operation mode in which a blade load is more suppressed than in the current operation mode, the wind velocity V is compared to the threshold V1_on or V2_on to select one of the operation modes.

The threshold Vt_on of wind velocity is a threshold for determining whether to change the operation mode of the wind turbine power generating apparatus 1 to the stop mode, if the wind velocity increases even higher during operation in the second suppressing mode.

Furthermore, the cutout wind velocity Vco is a setting value for stopping the wind turbine power generating apparatus 1 when the wind velocity reaches the cutout wind velocity Vco or higher. The cutout wind velocity Vco may be set separately from the threshold of wind velocity V for selecting an operation mode (i.e., the load-suppressing operation mode or the normal operation mode) according to an embodiment.

Furthermore, if the wind-velocity reduces to fall below V2_off (where V2_off<V2_on) while the wind turbine power generating apparatus 1 is operated in the second suppressing mode, the operation mode shifts (returns) to the first suppressing mode. If the wind velocity further decreases to fall below V1_off (where V1_off<V1_on), the operation mode returns to the normal operation mode.

Specifically, in the step S106 (see FIG. 3) of determining a flag of an operation mode on the basis of wind velocity, to determine whether to select an operation mode in which a blade load is less suppressed than in the current operation mode (an operation mode closer to the normal operation mode), the wind velocity V is compared to V1_off or V2_off to select one of the operation modes.

A gap is provided as described above between, for instance, between the threshold V1_on of wind velocity for determining whether to shift from the normal operation mode to the first suppressing mode, and the threshold V1_off of wind velocity for determining whether to shift from the first suppressing mode to the normal operation mode, so as to prevent frequent transitions between operation modes in a case where the wind velocity changes drastically, for instance, to protect the wind turbine power generating apparatus 1.

The threshold Vt_off of wind velocity is a threshold for determining whether to change operation of the wind turbine power generating apparatus 1 to the second suppressing mode, when the wind velocity decreases during operation in the stop mode.

FIG. 8 is a diagram showing a relationship between a threshold of the wind velocity V, an operation mode, and wind direction, in an operation method according to an embodiment, where the relationship between the threshold of the wind velocity V, the operation mode, and the wind direction is shown in a polar coordinate system centered at the installation point O of the wind turbine power generating apparatus 1.

An angle on the polar coordinate of FIG. 8 indicates a wind direction (a direction of an upwind side of wind toward the wind turbine rotor 5), where 0° is north, 90° is east, 180° is south, and 270° is west, for instance.

Furthermore, in the polar coordinate of FIG. 8, the distance from the center O (installation point O of the wind turbine power generating apparatus 1) in the radial direction indicates the magnitude of the wind velocity.

Furthermore, the circle formed by a dashed line indicates a cutout wind velocity Vco. In FIG. 8, the cutout wind velocity Vco is constant in every direction regardless of the wind direction.

Furthermore, zone 1 and zone 2 are set in the predetermined wind-direction range. Zone 1 depicted in FIG. 8 is a range of wind direction not less than WD1_min and not more than WD1_max and zone 2 is a range of wind direction not less than WD2_min and not more than WD2_max.

Zone 1 and zone 2 are, for instance, ranges of wind velocity in which the wind-velocity distribution within a rotational plane of the wind turbine rotor 5 is likely to be turbulent and wind shear tends to be strong, due to an influence from the surrounding environment such as terrain and arrangement of other wind turbine power generating apparatuses around the wind turbine power generating apparatus 1.

In the polar coordinate of FIG. 8, in zone 1 and zone 2, the regular wind-direction ranges, thresholds of wind velocity are set, corresponding to a plurality of operation modes including the normal operation mode (Mode0) and the load-suppressing operation modes (Mode1, Mode2). Specifically, thresholds set in zone 1 and zone 2 include: a threshold V1_on of wind velocity for determining transition from the normal operation mode to the first suppressing mode; a threshold V2_on of wind velocity for determining transition from the first suppressing mode to the second suppressing mode; and a threshold Vt_on of wind velocity for determining transition from the second suppressing mode to the stop mode.

On the other hand, for wind directions other than zone 1 and zone 2, only the cutout wind velocity Vco is set, which is a threshold having a value larger than the above described thresholds V1_on, V2_on, and Vt_on in zone 1 and zone 2, but thresholds of the wind velocity V for determining transition of an operation mode including the normal operation mode and the load-suppressing operation mode are not set.

As described above, in particular directions including zone 1 and zone 2, where turbulence is likely to occur in an air flow of wind toward the wind turbine rotor 5, such as strong wind shear in the rotor plane, thresholds of the wind velocity V (V1_on, V2_on, and Vt_on in the example of FIG. 8) are set to be relatively small, and thereby it is possible to appropriately reduce a load or a fluctuating load on the wind turbine blade 2 in the particular directions, and to appropriately suppress contact of the wind turbine blade 2 with the tower or occurrence of damage to the wind turbine blade or the like.

On the other hand, for wind directions other than zone 1 and zone 2, where turbulence tends to be smaller in an air flow of wind toward the wind turbine rotor 5, such as less stronger wind shear in the rotor plane, thresholds of the wind velocity V (cutout wind velocity Vco in the example of FIG. 8) are set to be relatively large, and thereby it is possible to increase the opportunity of power generation by the wind turbine power generating apparatus 1 when the wind direction is not in zone 1 or zone 2.

Furthermore, different thresholds may be set for a plurality of particular wind-directional ranges.

In the example depicted in FIG. 8, wind shear tends to be larger in the wind-direction range of zone 1 than in the wind-direction range of zone 2. Furthermore, thresholds of wind velocity for determining whether to shift from the normal operation mode to the first suppressing mode, from the first suppressing mode to the second suppressing mode, and from the second suppressing mode to the stop mode, are V1_on(z1), V2_on(z1), and V1_t(z1) in zone 1, respectively, and V1_on(z2), V2_on(z2), and V1_t(z2) in zone 2, respectively. Also, the thresholds in zone 1 are smaller than the respective thresholds in zone 2 (that is, thresholds satisfy a relationship V1_on(z1)<V1_on(z2), for example).

As described above, in the wind-direction range of zone 1 where turbulence tends to be large in an air flow of wind toward the wind turbine rotor 5, such as strong wind shear or the like, thresholds set to determine whether to shift the operation modes are smaller than those for zone 2, and thereby a load-suppressing operation mode can be selected in zone 1 even when the wind velocity is relatively small. Accordingly, it is possible to select an operation mode appropriately for the wind turbine power generating apparatus 1.

Next, with reference to FIGS. 9 to 14, described is setting variable thresholds of the index I of turbulence degree of wind velocity in accordance with wind direction, in the method of operating the wind turbine power generating apparatus 1 according to some embodiments.

In some embodiments, the thresholds of the index I of turbulence degree of wind velocity are variable in accordance with wind direction in the operation method shown in the flowchart of FIG. 4 described above. Described below is a case in which the thresholds of the index I of turbulence degree of wind velocity are variable in accordance with wind direction, on the basis of the operation method shown in the flowchart of FIG. 4.

In the present specification, turbulence degree of wind velocity is turbulence degree of wind velocity in a predetermined period, which indicates variation of wind velocity with respect to time.

In an embodiment, as the index I of turbulence degree of wind velocity, a standard deviation σ of time-series data of wind velocity V in a predetermined period T can be used. Furthermore, in an embodiment, as the index I of turbulence degree of wind velocity, turbulence intensity TI of the wind velocity V in the predetermined period T can be used. The turbulence intensity TI can be expressed by the following expression (1):

$$TI = \sigma/Vm \quad (1)$$

where σ is a standard deviation of time-series data of the wind velocity V in the predetermined period T and Vm is an average of time series data of the wind velocity V (mean wind velocity).

Specifically, the index I of turbulence degree of wind velocity is calculated on the basis of the wind velocity V in the predetermined period T.

In some embodiments, in the operating method shown in the flowchart of FIG. 4, the index I of turbulence degree of wind velocity is calculated in step S205, on the basis of the wind velocity V obtained in step S202.

The turbulence degree of wind velocity is an index of a load or a fluctuating load on the wind turbine blade 2, and thus may affect contact of the wind turbine blade 2 with the tower 9 or damage to the wind turbine blade 2 or the like.

Meanwhile, turbulence in an air flow of wind toward the wind turbine rotor 5 is affected by the surrounding environment of the wind turbine power generating apparatus 1 (e.g. terrain or arrangement of other wind turbine power generating apparatuses around the wind turbine power generating apparatus 1), and thus a load or a fluctuating load on the wind turbine blade 2 may vary depending on wind direction even if the turbulence degree of wind velocity is the same.

In view of this, thresholds of the index I of turbulence degree of wind velocity are set variable in accordance with wind direction, and thereby it is possible to select an operation mode in accordance with the wind direction more appropriately as compared to in a case where thresholds of turbulence of wind velocity are constant regardless of the wind direction. Accordingly, for example, for particular wind directions which tend to be accompanied by strong wind shear in the rotor plane, thresholds of the index I of turbulence degree of wind velocity are set to be relatively small, and thereby it is possible to appropriately reduce a load or a fluctuating load on the wind turbine blade in the particular directions, and to appropriately suppress contact of the wind turbine blade 2 with the tower 9 and occurrence of damage to the wind turbine blade 2 or the like. On the other hand, for another wind directions which tend to be accompanied by less strong wind shear in the rotor plane, for instance, thresholds of the index I of turbulence degree of wind velocity are set to be relatively large, and thereby it is possible to increase the opportunity of power generation by the wind turbine power generating apparatus 1 in the particular wind directions.

Figure 9:
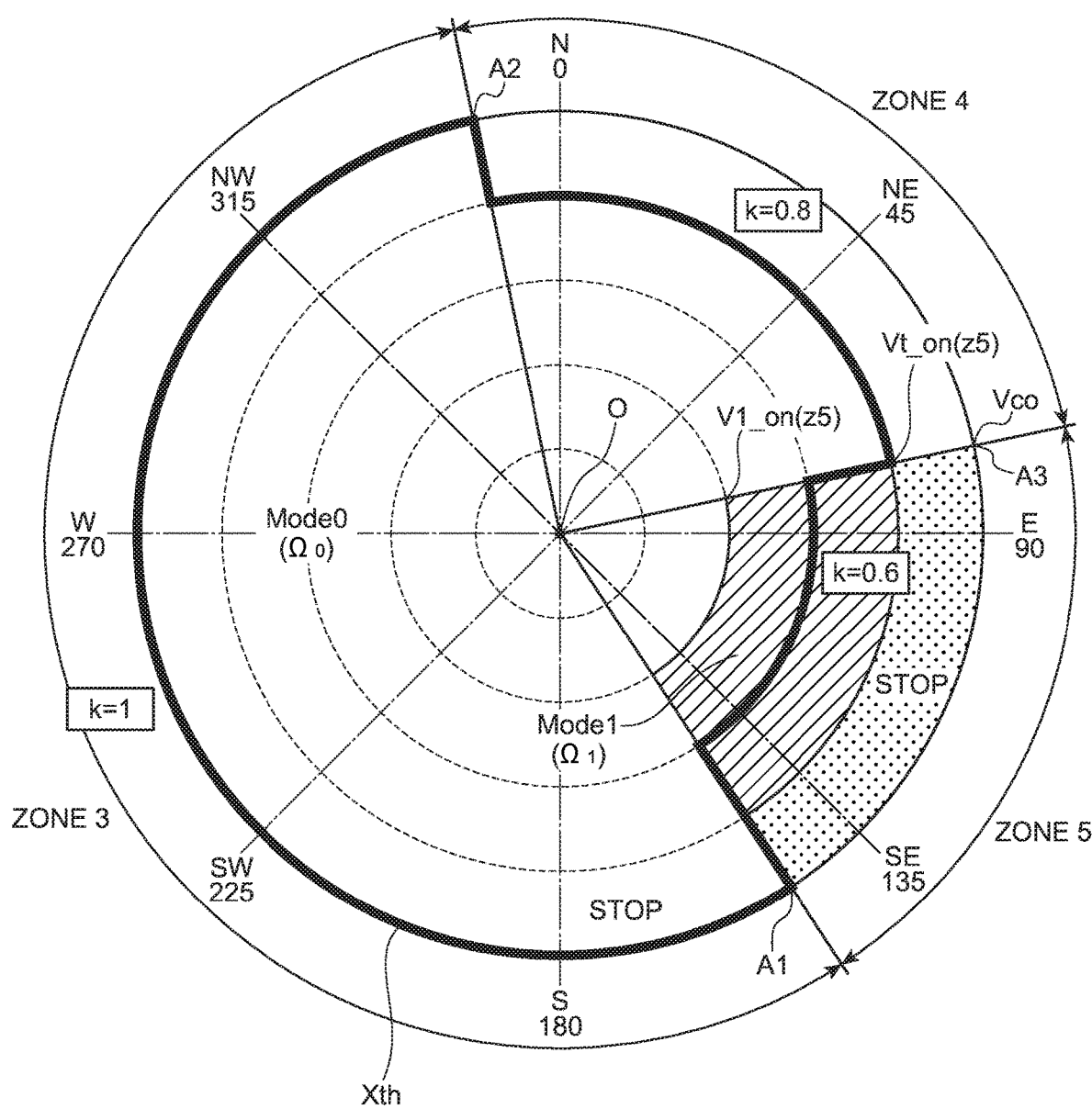
FIG. 9 is a diagram showing a relationship between a threshold of an index of turbulence degree of wind velocity, an operation mode, and a wind direction, in an operation method according to an embodiment.

FIG. 9 is a diagram showing a relationship between thresholds of the index I of turbulence degree of wind velocity, an operation mode, and a wind direction, in an operation method according to an embodiment, where the relationship between the thresholds of the index I of turbulence degree of wind velocity, the operation mode, and the wind direction is shown in a polar coordinate system centered at the installation point O of the wind turbine power generating apparatus 1.

An angle on the polar coordinate of FIG. 9 indicates a wind direction (a direction of an upwind side of wind toward the wind turbine rotor 5), where 0° is north, 90° is east, 180° is south, and 270° is west, for instance.

In the polar coordinate of FIG. 9, the thresholds of the index I of turbulence degree of wind velocity are indicated by a thick solid line, while the distance from the center O (installation point O of the wind turbine power generating apparatus 1) in the radial direction indicates the magnitude of the index I of turbulence degree of wind velocity.

Furthermore, in the coordinate of FIG. 9, the distance from the center O (installation point O of the wind turbine power generating apparatus 1) in the radial direction also indicates the magnitude of the wind velocity, where Vco indicates the wind velocity Vco. In FIG. 9, the cutout wind velocity Vco is constant in every direction regardless of wind direction.

Furthermore, in the polar coordinate system of FIG. 9, zone 3, zone 4 and zone 5 are set in the predetermined wind-direction range. In FIG. 9, zone 3 is a wind-directional range of from A1 to A2, zone 4 is a wind-directional range of from A2 to A3, and zone 5 is a wind-directional range of from A3 to A1.

The zone 4 and zone 5 are wind-velocity ranges in which the wind-velocity distribution within a rotational plane of the wind turbine rotor 5 is likely to be turbulent and wind shear tends to be stronger than in zone 3, due to an influence from the surrounding environment including terrain and arrangement of other wind turbine power generating apparatuses around the wind turbine power generating apparatus 1. More specifically, zone 5 is a wind-velocity range in which the wind-velocity distribution within a rotational plane of the wind turbine rotor 5 is likely to be turbulent and wind shear tends to be stronger than in zone 4.

In some embodiments, when the wind direction of the wind turbine power generating apparatus 1 is in the second range, which is at least a part of the range other than the first range, the threshold of the index I of turbulence degree is $k \times X_{th}$ (where $0 \leq k < 1$), provided that $X_{th}$ is the threshold of the index I of turbulence degree when the wind direction is in the first range.

For instance, in the example of FIG. 9, the threshold of the index I of turbulence degree of wind velocity is $X_{th}$ when the wind direction of the wind turbine power generating apparatus 1 is in the range of zone 3 (first range), and the threshold of the index I of turbulence degree of wind velocity is $0.8 \times X_{th}$ (i.e., $k=0.8$) when the wind direction is in the range of zone 4 (second range). Furthermore, the threshold of the index I of turbulence degree of wind velocity is $0.6 \times X_{th}$ (i.e., $k=0.6$) when the wind direction is in the range of zone 5 (second range).

Accordingly, thresholds $k \times X_{th}$ are set for zone 4 and zone 5 (second range) by multiplying the threshold $X_{th}$ of zone 3 (first range) by k (where, $0 \leq k < 1$), and thereby it is possible to set relatively smaller thresholds for zone 4 and zone 5 (second range) of wind-directional range where wind shear tends to be stronger. Accordingly, it is possible to select an operation mode appropriately for the wind turbine power generating apparatus 1.

Furthermore, in zone 5, where wind shear is stronger than in zone 4, a threshold $0.6 \times X_{th}$ smaller than the threshold $0.8 \times X_{th}$ in zone 4 is set, and thereby it is possible to appropriately reduce a load or a fluctuating load on the wind turbine blade in the particular wind direction more effectively, to appropriately suppress contact of the wind turbine blade 2 with the tower 9 and occurrence of damage to the wind turbine blade 2 or the like.

In FIG. 9, in zone 5, thresholds V1_on (z5) and Vt_on (z5) of the wind velocity V are also set, for determining whether to shift the operation mode. Accordingly, it is possible to select an operation mode more appropriately for the wind turbine power generating apparatus 1 by selecting an operation mode on the basis of both of the thresholds of the wind velocity V and the thresholds of the index I of turbulence degree of wind velocity.

In some embodiments, the thresholds of the index I of turbulence degree of wind velocity for selecting an operation mode of the wind turbine power generating apparatus 1 are variable in accordance with the wind velocity V.

That is, the thresholds of the index I of turbulence degree of wind velocity are determined on the basis of combination of the index I of turbulence degree of wind velocity and the wind velocity V.

Next, with reference to FIGS. 10 to 14, described is a case in which the thresholds of the index I of turbulence degree of wind velocity are variable in accordance with the wind velocity V as described above.

Figure 10:
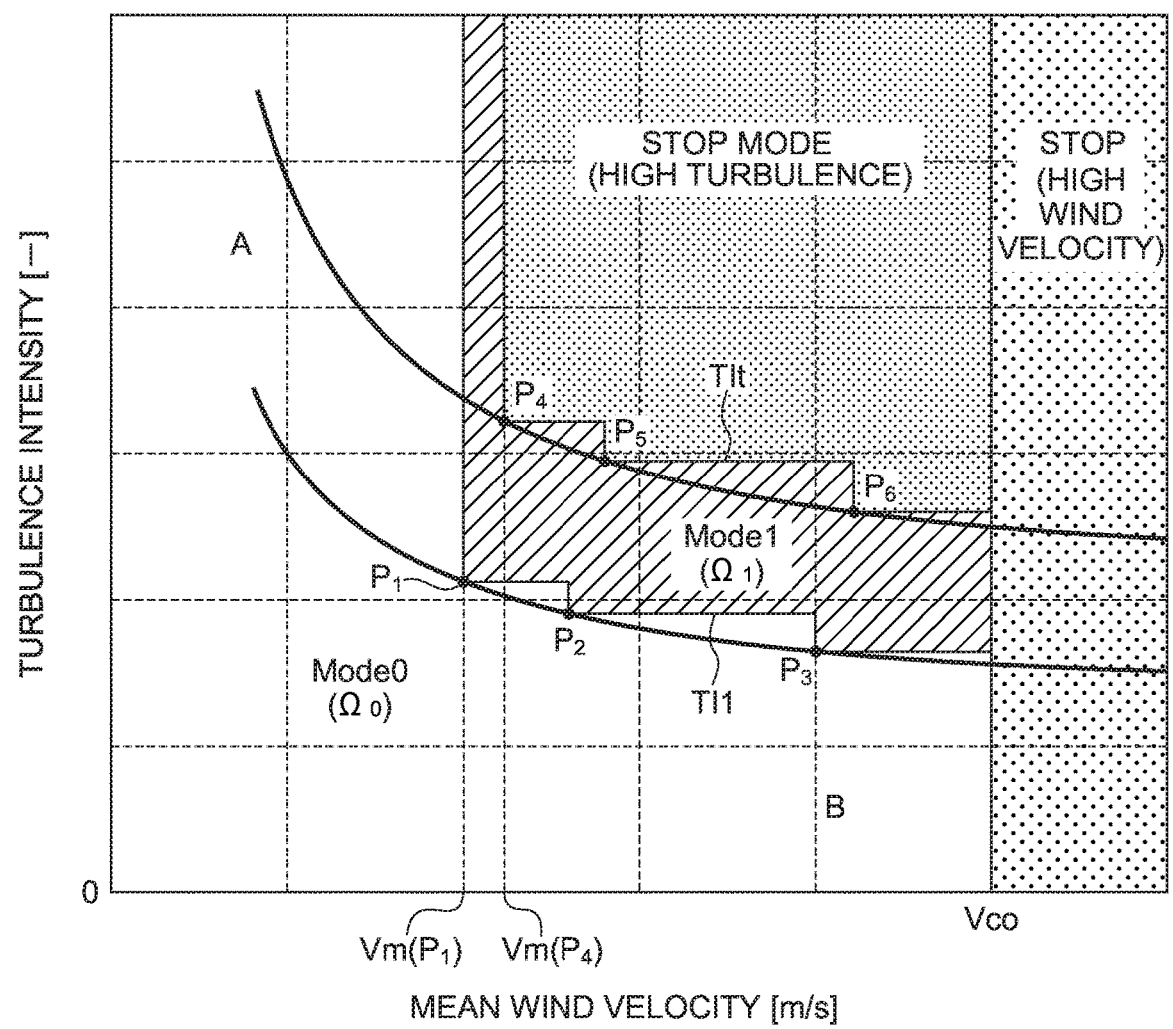
FIGS. 10 to 14 are each a graph showing a relationship between a threshold of an index of turbulence degree of wind velocity and a wind velocity according to an embodiment.

FIG. 10 is a graph showing a relationship between the threshold of the index I of turbulence degree of wind velocity and the wind velocity V according to an embodiment. In FIG. 10, x-axis is the mean wind velocity Vm, and y-axis is the above described turbulence intensity TI ($=\sigma/Vm$). In the example of FIG. 10, the thresholds of the index I of turbulence degree of wind velocity are variable in accordance with the mean wind velocity Vm.

In the graph of FIG. 10, shown are thresholds TI1 and TIt of the turbulence intensity TI for selecting an operation mode from among a plurality of operation modes including the normal operation mode (Mode0), the first suppressing mode (Mode1), and the stop mode. In the example depicted in FIG. 10, the stop mode is selected on the basis of the wind velocity regardless of the turbulence intensity TI, in a region where the wind velocity is larger than the cutout wind velocity Vco.

Also in the examples depicted in FIGS. 11 to 14 described below, the stop mode is selected on the basis of the wind velocity regardless of the turbulence intensity TI, in a region where the wind velocity is larger than the cutout wind velocity Vco.

In FIG. 10, the threshold TI1 of the turbulence intensity TI is a threshold for determining which one of the normal operation mode or the first suppressing mode to select. The threshold TI1 is defined by a boundary between a region of the normal operation mode (Mode0) and a region of the first suppressing mode (Mode1) in the graph of FIG. 10. The boundary may be obtained by connecting points P1 to P3 with straight lines. The points P1 to P3 may be determined by document research, or on the basis of experiments or experience.

In FIG. 10, the threshold TIt of the turbulence intensity TI is a threshold for determining which one of the first suppressing mode or the stop mode to select. The threshold TIt is defined by a boundary between a region of the first suppressing mode (Mode1) and a region of the stop mode (high turbulence) in the graph of FIG. 10. The boundary may be obtained by connecting points P4 to P6 with straight lines. The points P4 to P6 may be determined by document research, or on the basis of experiments or experience.

Each of the thresholds TI1 and TIt of the turbulence intensity TI in FIG. 10 is variable in accordance with wind velocity. Specifically, the threshold TI1 of the turbulence intensity decreases in a stepped pattern with an increase in the wind velocity, in a region where the mean wind velocity Vm is not less than Vm ($P_1$) and not more than Vco (cutout wind velocity). Furthermore, the threshold TIt of the turbulence intensity decreases in a stepped pattern with an increase in the wind velocity, in a region where the mean wind velocity Vm is not less than Vm ($P_4$) and not more than Vco (cutout wind velocity).

In the example depicted in FIG. 10, the suppressing operation mode and the stop mode are not selected in a region where the mean wind velocity Vm is relatively small even though the turbulence intensity TI is relatively large (e.g. region A in FIG. 10). Furthermore, the suppressing operation mode and the stop mode are not selected in a region where the turbulence intensity TI of wind velocity is relatively small even though the mean wind velocity Vm is relatively large (e.g. region B in FIG. 10).

For instance, if the wind velocity is relatively small even though the turbulence of wind velocity is relatively large, or if the turbulence of wind velocity is relatively small even though the wind velocity is relatively large, the load on the wind turbine blade 2 may be of such a level that does not affect contact of the wind turbine blade 2 with the tower 9 and occurrence of damage to the wind turbine blade 2 or the like.

As in the example depicted in FIG. 10, the threshold of the index I of turbulence degree of wind velocity is set to be variable appropriately in accordance with the wind velocity (mean wind velocity Vm), and thereby it is possible to select the normal operation mode without selecting a suppressing operation mode unnecessarily, and to improve the total power generation amount of the wind turbine power generating apparatus 1 in such a case.

As described above, in the example depicted in FIG. 10, the thresholds TI1 and TIt of turbulence intensity, an index of turbulence degree of wind velocity, are variable in accordance with the mean wind velocity Vm, and thereby it is possible to select an operation mode on the basis of the thresholds TI1 and TIt of turbulence intensity corresponding to the combination of the mean wind velocity Vm and the turbulence degree of wind velocity. Accordingly, it is possible to increase the opportunity of power generation by the wind turbine power generating apparatus 1 while reducing a load or a fluctuating load applied to the wind turbine blade 2 more effectively, and suppressing contact of the wind turbine blade 2 with the tower 9 and occurrence of damage to the wind turbine blade 2 or the like more effectively.

Figure 11:
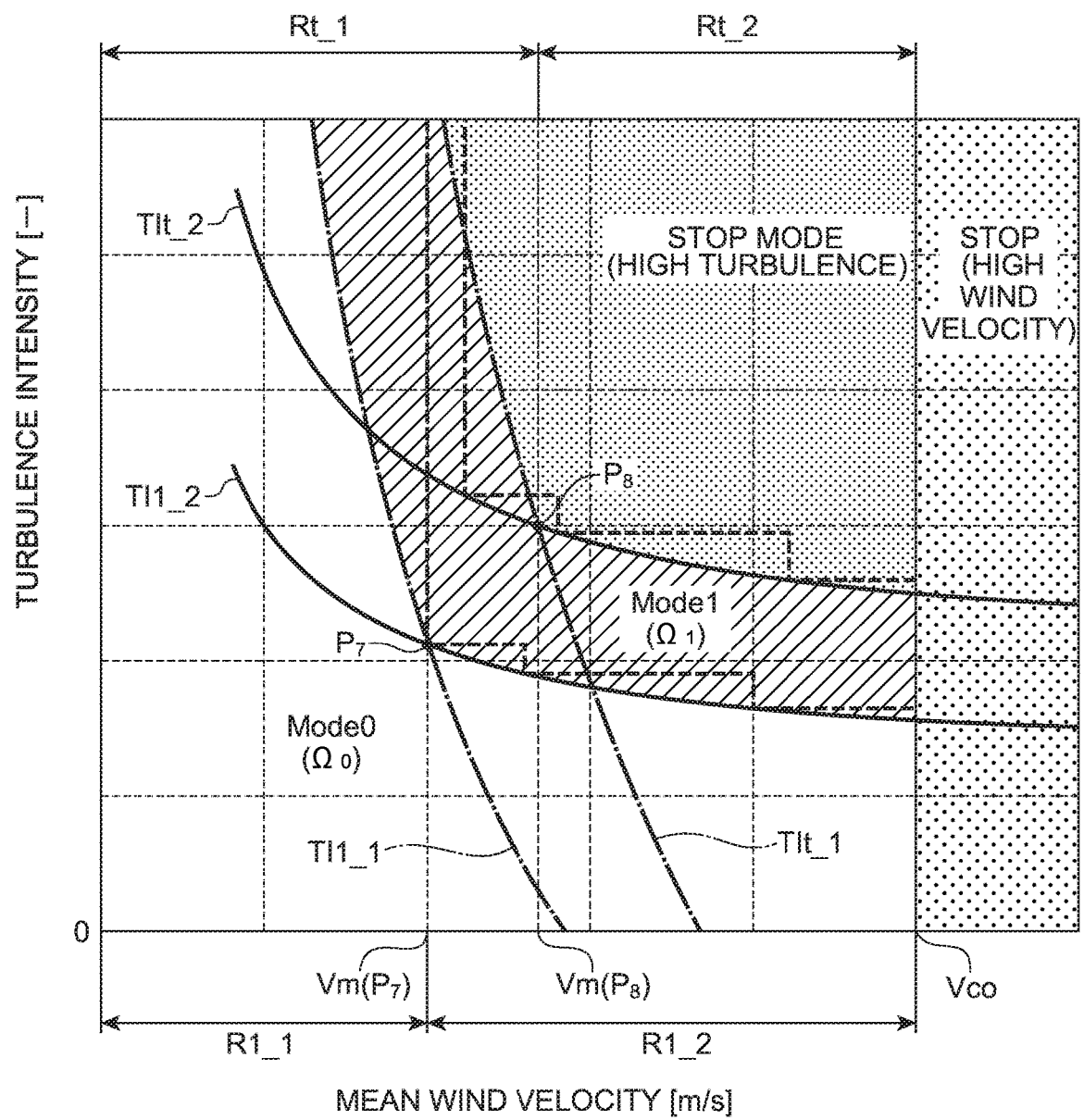
Figure 12:
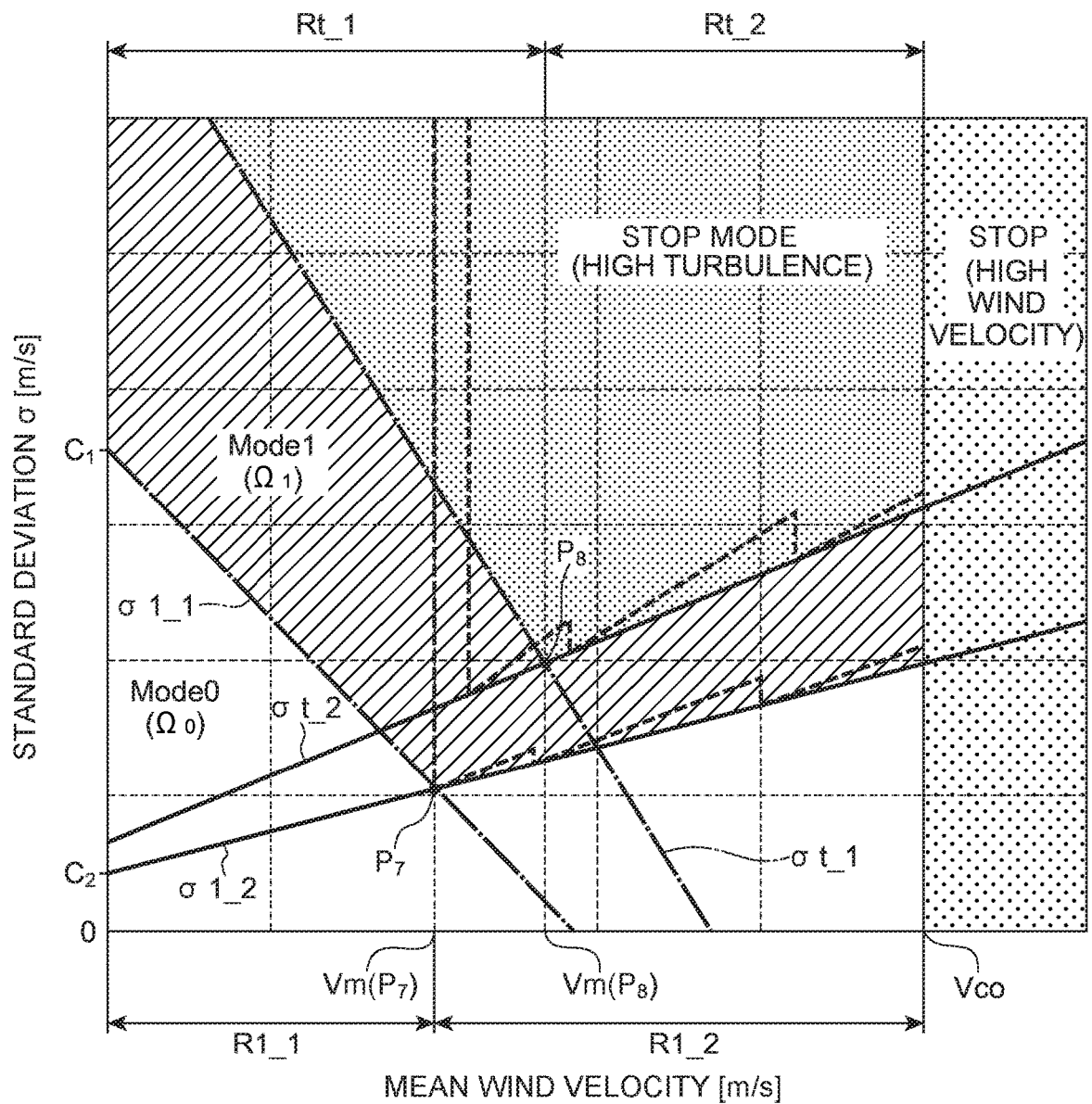

FIGS. 11 and 12 are each a graph showing a relationship between thresholds of the index I of turbulence degree of wind velocity and wind velocity V according to an embodiment.

In FIG. 11, x-axis is the mean wind velocity Vm, and y-axis is the above described turbulence intensity TI (=σ/Vm). In FIG. 12, x-axis is the mean wind velocity Vm, and y-axis is the standard deviation σ of the above described wind velocity V.

In the example shown in FIGS. 11 and 12, the thresholds of the index I of turbulence degree of wind velocity (mean wind velocity Vm in FIG. 11 and standard deviation σ in FIG. 12) are variable in accordance with the mean wind velocity Vm.

In the graph of FIG. 11, shown are thresholds TI1_1, TI1_2, and TIt_2 of the turbulence intensity TI for selecting an operation mode from among a plurality of operation modes including the normal operation mode (Mode0), the first suppressing mode (Mode1), and the stop mode.

In the graph of FIG. 12, shown are thresholds σ1_1, σ1_2, σt_1, and σt_2 of the standard deviation σ for selecting an operation mode from among a plurality of operation modes including the normal operation mode (Mode0), the first suppressing mode (Mode1), and the stop mode.

The graph of FIG. 11 and the graph of FIG. 12 are equivalent, whereby the graph of the standard deviation σ in FIG. 12 can be obtained by multiplying the graph of the turbulence intensity TI of FIG. 11 by the mean wind velocity Vm. Furthermore, the graph of the turbulence intensity TI in FIG. 11 can be obtained by dividing the graph of the standard deviation σ of FIG. 12 by the mean wind velocity Vm.

The graph showing the thresholds of the turbulence intensity TI as in FIG. 11 and the graph indicating the thresholds of the standard deviation σ as in FIG. 12 may be defined as functions that pass through some points selected as reference points (e.g. P1 to P6 in FIG. 10), or by interpolation or extrapolation by using such points.

In FIG. 11, in the range R1_1 (first range) where the mean wind velocity is less than a predetermined value Vm (P$_7$), the threshold TI1_1 of the turbulence intensity TI is a threshold for determining which one of the normal operation mode or the first suppressing mode to select. Furthermore, in the range R1_2 (second range) where the mean wind velocity is not less than the predetermined value Vm (P$_7$), the threshold TI1_2 of the turbulence intensity TI is a threshold for determining which one of the normal operation mode or the first suppressing mode to select. Here, Vm (P$_7$) is a mean wind velocity at an intersection point P$_7$ between the thresholds TI1_1 and TI1_2 of the turbulence intensity TI.

In FIG. 12, in the range R1_1 (first range) where the mean wind velocity is less than a predetermined value Vm (P$_7$), the threshold σ1_1 of the standard deviation σ is a threshold for determining which one of the normal operation mode or the first suppressing mode to select. Furthermore, in the range R1_2 (second range) where the mean wind velocity is not less than the predetermined value Vm (P$_7$), the threshold σ1_2 of the turbulence intensity TI is a threshold for determining which one of the normal operation mode or the first suppressing mode to select.

Here, Vm (P$_7$) is the mean wind velocity at the intersection point P$_7$ of the thresholds σ1_1 and σ1_2 of the standard deviation σ, and also the mean wind velocity at the intersection point P$_7$ of the thresholds TI1_1 and TI1_2 of the above described turbulence intensity TI.

In FIG. 12, the threshold of the standard deviation σ is expressed as a linear function of the mean wind velocity Vm. The threshold σ1_1 defining the threshold of the standard deviation σ in the range R1_1 (first range) and σ1_2 defining the threshold of the standard deviation σ in the range R1_2 (second range) can be expressed as linear functions of the mean wind velocity Vm by the following expressions, respectively:

$$\sigma1\_1 = k_1 Vm + c_1 \quad (2)$$

$$\sigma1\_2 = k_2 Vm + c_2 \quad (3)$$

where $k_1$ and $c_1$ are the slope and the intercept in the graph of σ1_1, while $k_2$ and $c_2$ are the slope and the intercept in the graph of σ1_2.

Specifically, in the example depicted in FIG. 12, the index I of turbulence degree is the standard deviation σ of time-series data of the wind velocity V, and the thresholds of the standard deviation σ of wind velocity are expressed by different linear functions of the wind velocity (linear functions expressed by the above expressions (2) and (3)), in the range R1_1 (first range) where the wind velocity V (mean wind velocity Vm) is less than the predetermined value Vm (P$_7$) and in the range R1_2 (second range) where the wind velocity V is not less than the predetermined value Vm (P$_7$).

As shown in FIG. 12, the intercept $c_1$ of the linear function (function expressed by the above expression (2)) of wind velocity defining the threshold σ1_1 in the range R1_1 (first range) is greater than the intercept $c_2$ of the linear function (function expressed by the above expression (3)) of wind velocity defining the threshold σ1_2 in the range R1_2 (second range). Also, the slope $k_1$ of the linear function (function expressed by the above expression (2)) defining the threshold σ1_1 in the range R1_1 (first range) is negative, while the intercept $k_2$ of the linear function (function expressed by the above expression (3)) defining the threshold σ1_2 in the range R1_2 (second range) is positive.

Here, when the threshold of the standard deviation σ depicted in FIG. 12 is converted into the threshold of the turbulence intensity TI shown in FIG. 11 (=(standard deviation σ of time-series data of wind velocity)/(mean value Vm of time-series data of wind velocity)), the threshold σ1_1 of the standard deviation in the range R1_1 (first range) in FIG. 12 is converted into the threshold TI1_1 of the turbulence intensity in the range R1_1 (first range) in FIG. 11. Furthermore, the threshold σ1_2 of standard deviation in the range R1_2 (second range) in FIG. 12 is converted into the threshold TI1_2 of the turbulence intensity in the range R1_2 (second range) in FIG. 11.

The thresholds TI1_1 and TI1_2 of turbulence intensity shown in FIG. 11 increase rapidly with a decrease in the mean wind velocity Vm in the range R1_1 (first range), which is a relatively-low wind velocity region, and decrease gradually with an increase in the mean wind velocity Vm in the range R1_2 (second range), which is a relatively high wind-velocity region.

Accordingly, in the range R1_1 (first range) of a relatively low wind-velocity range, the threshold TI1_1 of turbulence intensity rapidly increases with a decrease in the wind velocity (mean wind velocity Vm), and thus the opportunity to select the normal operation mode at a low wind velocity increases, which makes it possible to ensure a power generation amount of the wind turbine power generating apparatus 1. Furthermore, in the range R1_2 (second range) of a relatively high wind-velocity range, the threshold TI1_2 of turbulence intensity gradually decreases with an increase in the wind velocity (mean wind velocity Vm), and thus the opportunity to select a load-suppressing operation mode at a high wind velocity increases, which makes it possible to appropriately suppress contact of the wind turbine blade 2 with the tower 9 and occurrence of damage to the wind turbine blade 2 or the like.

In FIGS. 11 and 12, also shown is the threshold of the index I of turbulence degree of wind velocity for determining which of the first suppressing mode or the stop mode to select.

In FIG. 11, the threshold TIt_1 of the turbulence intensity TI in the range Rt_1 (first range) and the threshold TIt_2 of the turbulence intensity TI in the range Rt_2 (second range) are such thresholds. Furthermore, in FIG. 12, the threshold σt_1 of the standard deviation σ in the range Rt_1 (first range) and the threshold σt_2 of the standard deviation σ in the range Rt_2 (second range) are such thresholds.

For the thresholds of the index I of turbulence degree of wind velocity for determining which one of the normal operation mode or the first suppressing mode to select can be described similarly to the above described thresholds of the index I of turbulence degree of wind velocity for determining which one of the normal operation mode or the first suppressing mode to select.

Specifically, the thresholds of the standard deviation σ of wind velocity depicted in FIG. 12 is expressed by different linear functions of wind velocity (mean wind velocity Vm) in the range Rt_1 (first range) where the wind velocity (mean wind velocity Vm) is less than a predetermined value V (P$_8$) and the range Rt_2 (second range) where the wind velocity is not less than the predetermined value V (P$_8$). The intercept of the linear function of wind velocity defining the threshold in the range Rt_1 (first range) is larger than the intercept of the linear function of wind velocity defining the threshold in the range Rt_2 (second range). The slope of the linear function of wind velocity defining the threshold in the range Rt_1 (first range) is negative, while the slope of the linear function of wind velocity defining the threshold in the range Rt_2 (second range) is positive.

Here, Vm (P$_8$) is the mean wind velocity at the intersection point P$_8$ of the thresholds σt_1 and σt_2 of the standard deviation σ, and also the mean wind velocity at the intersection point P$_8$ of the thresholds TIt_1 and TIt_2 of the above described turbulence intensity TI.

By setting such thresholds, the opportunity to select the first suppressing mode in the range Rt_1 (first range) of a relatively low wind-velocity range increases, and thereby it is possible to ensure the power generation amount of the wind turbine power generating apparatus 1. Furthermore, in the range Rt_2 (second range) of a relatively high wind-velocity range, the opportunity to select the stop mode increases, which makes it possible to appropriately suppress contact of the wind turbine blade 2 with the tower 9 and occurrence of damage to the wind turbine blade 2 or the like.

Figure 13:
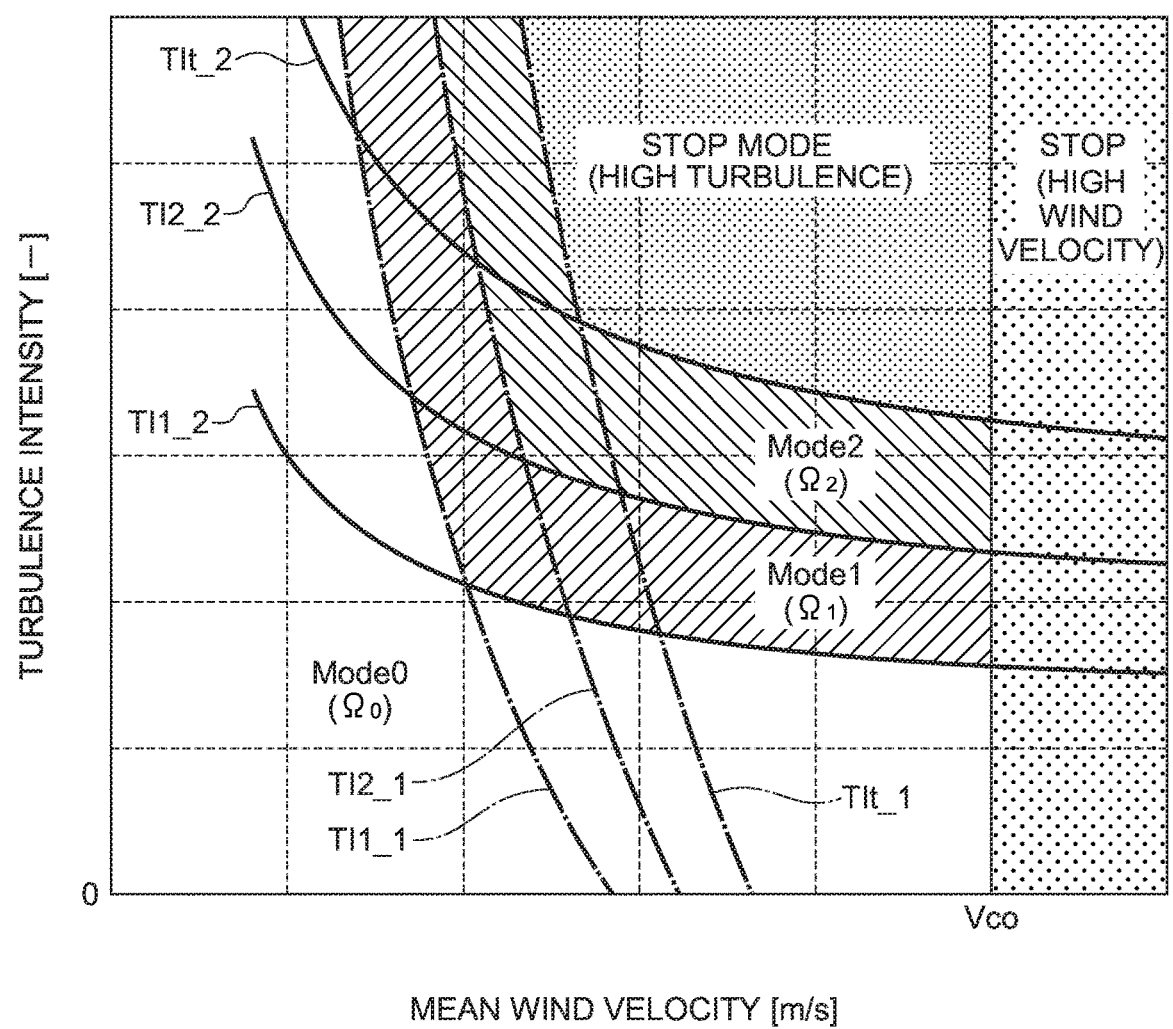
Figure 14:
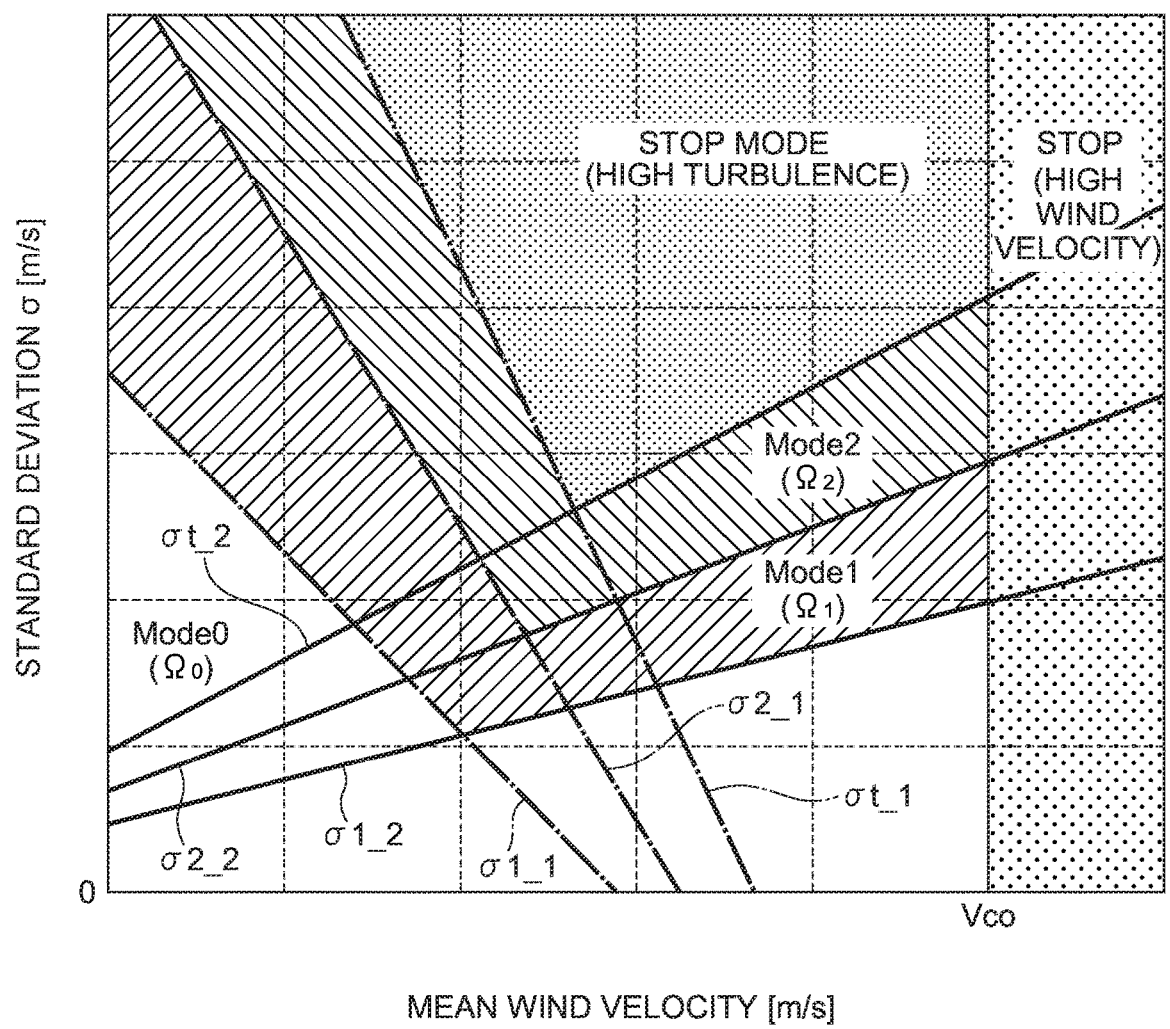

FIGS. 13 and 14 are each a graph showing a relationship between the thresholds of the index I of turbulence degree of wind velocity and the wind velocity V according to an embodiment.

The x-axis and y-axis in the graphs of FIGS. 13 and 14 represent the same as the x-axis and y-axis in the graphs of FIGS. 11 and 12.

In the graphs of FIGS. 13 and 14, thresholds are set for selecting an operation mode from among a plurality of operation modes including the normal operation mode (Mode0), the first suppressing mode (Mode1), the second suppressing mode (Mode2), and the stop mode.

In FIG. 13, the thresholds TI1_1, TI1_2, TI2_1, TI2_2, TIt_1, and TIt_2 of the turbulence intensity TI are such thresholds. Furthermore, in the graph of FIG. 14, the thresholds σ1_1, σ1_2, σ2_1, σ2_2, σt_1, and σt_2 of the standard deviation σ of the mean wind velocity are such thresholds.

As described above, also in a case where an operation mode of the wind turbine power generating apparatus 1 is selected from among a plurality of operation modes including two or more load-suppressing operation modes, similarly to the above description, setting thresholds appropriately increases the opportunity to select the normal operation mode at a low wind velocity, which makes it possible to ensure a power generation amount of the wind turbine power generating apparatus 1, and also increases the opportunity to select a load-suppressing operation mode at a high wind velocity, which makes is possible to appropriately suppress contact of the wind turbine blade 2 with the tower 9 and occurrence of damage to the wind turbine blade 2 or the like.

In a method of operating the wind turbine power generating apparatus 1 according to some embodiments, the wind velocity V is obtained by the wind-velocity sensor 14, and the index I of the turbulence degree of wind velocity is obtained on the basis of the wind velocity. Thus, in the step of selecting an operation mode of the wind turbine power generating apparatus 1, the wind velocity V is compared to a threshold, and the index I of turbulence degree of wind velocity is compared to a threshold. If at least one of the wind velocity V or the index I of turbulence degree of wind velocity is at least the threshold, one of the at least one load-suppressing operation mode is selected.

In this case, an operation mode is selected on the basis of a plurality of indexes related to a load or a fluctuating load on the wind turbine blade 2 (i.e., the wind velocity V and the index I of turbulence degree of wind velocity), and thereby it is possible increase the opportunity of power generation by the wind turbine power generating apparatus 1 while reducing a load applied to the wind turbine blade 2 more effectively, and suppressing contact of the wind turbine blade 2 with the tower 9 and occurrence of damage to the wind turbine blade 2 or the like more effectively.

In the method of operating the wind turbine power generating apparatus 1 according to some embodiments, the load sensor 12 provided for the wind turbine blade 2 may be used to obtain the load M applied to the wind turbine blade 2. In the step of selecting an operation mode of the wind turbine power generating apparatus 1, the wind velocity V or the index I of turbulence degree of wind velocity is compared to a threshold, and the load M is compared to a threshold. If at least one of the wind velocity V or the load M, or at least one of the index I of turbulence degree of wind velocity or the load M is not less than the threshold, one of the at least one load-suppressing operation modes is selected.

In the method of operating the wind turbine power generating apparatus 1 according to some embodiments, the load sensor 12 provided for the wind turbine blade 2 may be used to obtain the load M applied to the wind turbine blade 2. In the step of selecting an operation mode of the wind turbine power generating apparatus 1, the wind velocity V, the index I of turbulence degree of wind velocity, and the load M are each compared to a threshold. If at least one of the wind velocity V, the index I of turbulence degree of wind velocity, or the load M is not less than the threshold, one of the at least one load-suppressing operation modes is selected.

As described above, an operation mode is selected on the basis of a plurality of indexes related to a load or a fluctuating load on the wind turbine blade 2 and the load M applied to the wind turbine blade 2, and thereby it is possible to reduce a load applied to the wind turbine blade 2 more effectively. Thus, it is possible to increase the opportunity of power generation by the wind turbine power generating apparatus 1 while reducing loads applied to components of the wind turbine (wind turbine power generating apparatus 1), and suppressing contact of the wind turbine blade 2 with the tower 9 and occurrence of damage to the wind turbine blade 2 or the like more effectively.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A method of operating a wind turbine power generating apparatus including a wind turbine rotor having a wind turbine blade, the method comprising:
   a step of obtaining a wind direction of a wind received by the wind turbine rotor;
   a step of obtaining an index of turbulence degree of the wind velocity of the wind received by the wind turbine rotor during an operation of the wind turbine power generating apparatus;
   a step of selecting an operation mode of the wind turbine power generating apparatus from among a plurality of operation modes including a normal operation mode and at least one load-suppressing operation mode in which a target rotation speed lower than the normal operation mode or a pitch angle closer to a feather side than the normal operation mode is set such that a load applied to the wind turbine blade is smaller than that in the normal operation mode, on the basis of whether the index of turbulence degree is at least a variable threshold; and
   a step of controlling the wind turbine power generating apparatus based on the selected operation mode,
   wherein the variable threshold of the index of turbulence degree is a second threshold $k \times X_{th}$, where k is a scaling factor which satisfies $0 \leq k < 1$, when the wind direction is in a second range being at least a part of a range other than a first range, provided that the variable threshold of the index of turbulence degree is a first threshold $X_{th}$ when the wind direction of the wind turbine power generating apparatus is in the first range, and
   wherein the step of controlling the wind turbine power generating apparatus includes:
      changing the target rotation speed or the pitch angle based on a newly selected operation mode in response to a first change in the index of the turbulence degree of the wind having the wind direction within the first range passing through the first threshold $X_{th}$; and
      changing the target rotation speed or the pitch angle based on a newly selected operation mode in response to a second change in the index of the turbulence degree of the wind having the wind direction within the second range passing through the second threshold $k \times X_{th}$.

2. The method of operating a wind turbine power generating apparatus according to claim 1,
   wherein the second range is a range where turbulence of an air flow of a wind toward the wind turbine rotor is larger than in the first range, due to another wind turbine power generating apparatus disposed around the wind turbine power generating apparatus or terrain surrounding the wind turbine power generating apparatus.

3. The method of operating a wind turbine power generating apparatus according to claim 1, further comprising:
   obtaining the wind velocity in addition to the index of turbulence degree, and
   wherein, in the step of selecting an operation mode, the at least one load-suppressing operation mode is selected if the wind velocity is at least a threshold.

4. The method of operating a wind turbine power generating apparatus according to claim 1, further comprising:
   a step of obtaining a load applied to the wind turbine blade,
   wherein, in the step of selecting an operation mode, an operation mode of the wind turbine power generating apparatus is selected from among the plurality of operation modes also on the basis of whether the load is at least a threshold.

5. The method of operating a wind turbine power generating apparatus according to claim 1,
   wherein the at least one load-suppressing operation mode includes a first load suppressing operation mode, and a second load suppressing operation mode in which the load is suppressed more than in the first load suppressing operation mode by reducing a rotation speed of the wind turbine rotor or by changing a pitch angle of the wind turbine blade to be closer to a feather side as compared to in the first load suppressing operation mode.

6. A method of operating a wind turbine power generating apparatus including a wind turbine rotor having a wind turbine blade, the method comprising:
- a step of obtaining a wind direction of a wind received by the wind turbine rotor;
- a step of obtaining an index of turbulence degree of a wind velocity of the wind received by the wind turbine rotor during an operation of the wind turbine generating apparatus;
- a step of selecting an operation mode of the wind turbine power generating apparatus from among a plurality of operation modes including a normal operation mode and at least one load-suppressing operation mode in which a target rotation speed lower than the normal operation mode or a pitch angle closer to a feather side than the normal operation mode is set such that a load applied to the wind turbine blade is smaller than in the normal operation mode, on the basis of whether the index of turbulence degree is at least a threshold; and
- a step of controlling the wind turbine power generating apparatus based on the selected operation mode,
- wherein the threshold of the index of turbulence degree is variable in accordance with the wind direction,
- wherein the threshold of the index of turbulence degree is variable in accordance with the wind velocity, and
- wherein the step of controlling the wind turbine power generating apparatus includes changing the target rotation speed or the pitch angle based on a newly selected operation mode in response to a change in the index of the turbulence degree when the index changes to pass through the threshold,
- wherein the index of turbulence degree is a standard deviation of time-series data of the wind velocity;
- wherein a threshold of the standard deviation of the wind velocity is expressed by different linear functions of the wind velocity in a first range where the wind velocity is less than a predetermined value and in a second range where the wind velocity is not less than the predetermined value,
- wherein an intercept of the linear function of the wind velocity defining the threshold in the first range is greater than an intercept of the linear function of the wind velocity defining the threshold in the second range; and
- wherein a slope of the linear function of the wind velocity defining the threshold in the first range is negative, and a slope of the linear function of the wind velocity defining the threshold in the second range is positive.

7. A wind turbine power generating apparatus, comprising:
- a wind turbine rotor comprising a wind turbine blade;
- a wind-direction sensor for obtaining a wind direction of a wind received by the wind turbine rotor;
- a wind-velocity sensor for obtaining a wind velocity of the wind received by the wind turbine rotor; and
- a controller configured to:
  - select an operation mode of the wind turbine power generating apparatus from among a plurality of operation modes including a normal operation mode and at least one load-suppressing operation mode in which a target rotation speed lower than the normal operation mode or a pitch angle closer to a feather side than the normal operation mode is set such that a load applied to the wind turbine blade is smaller than in the normal operation mode, on the basis of whether an index of turbulence degree of the wind velocity calculated from the wind velocity during an operation of the wind turbine power generating apparatus is at least a variable threshold; and
  - control the wind turbine power generating apparatus based on the selected operation mode,
- wherein the variable threshold of the index of turbulence degree is a second threshold $k \times X_{th}$, where k is a scaling factor which satisfies $0 \leq k < 1$, when the wind direction is in a second range being at least a part of a range other than a first range, provided that the variable threshold of the index of turbulence degree is a threshold $X_{th}$ when the wind direction of the wind turbine power generating apparatus is in the first range, and
- wherein the controller is configured to:
  - change the target rotation speed or the pitch angle based on a newly selected operation mode in response to a first change in the index of the turbulence degree of the wind having the wind direction within the first range passing through the first threshold $X_{th}$; and
  - change the target rotation speed or the pitch angle based on a newly selected operation mode in response to a second change in the index of the turbulence degree of the wind having the wind direction within the second range passing through the second threshold $k \times X_{th}$.

8. The wind turbine power generating apparatus according to claim 7,
- wherein the second range is a range where turbulence of an air flow of a wind toward the wind turbine rotor is larger than in the first range, due to another wind turbine power generating apparatus disposed around the wind turbine power generating apparatus or terrain surrounding the wind turbine power generating apparatus.

9. The wind turbine power generating apparatus according to claim 7,
- wherein the at least one load-suppressing operation mode includes a first load suppressing operation mode, and a second load suppressing operation mode in which the load is suppressed more than in the first load suppressing operation mode by reducing a rotation speed of the wind turbine rotor or by changing a pitch angle of the wind turbine blade to be closer to a feather side as compared to in the first load suppressing operation mode.

10. A wind turbine power generating apparatus, comprising:
- a wind turbine rotor comprising a wind turbine blade;
- a wind-direction sensor for obtaining a wind direction of a wind received by the wind turbine rotor;
- a wind-velocity sensor for obtaining a wind velocity of the wind received by the wind turbine rotor; and
- a controller configured to:
  - select an operation mode of the wind turbine power generating apparatus from among a plurality of operation modes including a normal operation mode and at least one load-suppressing operation mode in which a target rotation speed lower than the normal operation mode or a pitch angle closer to a feather side than the normal operation mode is set such that a load applied to the wind turbine blade is smaller than in the normal operation mode, on the basis of whether an index of turbulence degree of the wind velocity calculated from the wind velocity during an operation of the wind turbine power generating apparatus is at least a threshold; and
  - control the wind turbine power generating apparatus based on the selected operation mode, wherein the threshold of the index of turbulence degree is variable in accordance with the wind direction obtained by the wind-direction sensor, wherein the threshold of the index of turbulence degree is variable in accordance with the wind velocity, and wherein the controller is configured to change the target rotation speed or the pitch angle based on a newly selected operation mode in response to a change in the index of the turbulence degree when the index changes to pass through the threshold, wherein the index of turbulence degree is a standard deviation of time-series data of the wind velocity;

wherein a threshold of the standard deviation of the wind velocity is expressed by different linear functions of the wind velocity in a first range where the wind velocity is less than a predetermined value and in a second range where the wind velocity is not less than the predetermined value, wherein an intercept of the linear function of the wind velocity defining the threshold in the first range is greater than an intercept of the linear function of the wind velocity defining the threshold in the second range; and wherein a slope of the linear function of the wind velocity defining the threshold in the first range is negative, and a slope of the linear function of the wind velocity defining the threshold in the second range is positive.

* * * * *